(12) United States Patent
Lee et al.

(10) Patent No.: US 12,593,064 B2
(45) Date of Patent: *Mar. 31, 2026

(54) IMAGE ENCODING/DECODING METHOD AND APPARATUS, AND RECORDING MEDIUM STORING BITSTREAM

(71) Applicant: Electronics and Telecommunications Research Institute, Daejeon (KR)

(72) Inventors: Ha Hyun Lee, Seoul (KR); Jung Won Kang, Daejeon (KR); Sung Chang Lim, Daejeon (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/794,394

(22) Filed: Aug. 5, 2024

(65) Prior Publication Data

US 2024/0397090 A1 Nov. 28, 2024

Related U.S. Application Data

(63) Continuation of application No. 17/437,356, filed as application No. PCT/KR2020/003211 on Mar. 6, 2020, now Pat. No. 12,069,299.

(30) Foreign Application Priority Data

Mar. 8, 2019 (KR) ........................ 10-2019-0026790

(51) Int. Cl.
$H04N\ 19/593$ (2014.01)
$H04N\ 19/105$ (2014.01)
(Continued)

(52) U.S. Cl.
CPC ......... *H04N 19/593* (2014.11); *H04N 19/105* (2014.11); *H04N 19/139* (2014.11);
(Continued)

(58) Field of Classification Search
CPC .. H04N 19/593; H04N 19/105; H04N 19/139; H04N 19/176; H04N 19/52
See application file for complete search history.

(56) References Cited

U.S. PATENT DOCUMENTS

| | | | |
|---|---|---|---|
| 9,877,043 B2 | 1/2018 | He et al. | |
| 2015/0172704 A1 | 6/2015 | Kim et al. | |

(Continued)

FOREIGN PATENT DOCUMENTS

| | | |
|---|---|---|
| CN | 106464905 A | 2/2017 |
| CN | 109196864 A | 1/2019 |

(Continued)

OTHER PUBLICATIONS

Benjamin Bross et al., Versatile Video Coding (Draft 4), Joint Video Experts Team (JVET) of ITU-T SG 16 WP 3 and ISO/IEC JTC 1/SC 29/WG 11, Document: JVET-M1001-v7, 13th Meeting: Marrakech, MA, Jan. 9-18, 2019.

(Continued)

*Primary Examiner* — On S Mung
(74) *Attorney, Agent, or Firm* — BROADVIEW IP LAW, PC

(57) ABSTRACT

Disclosed herein is an image encoding/decoding method. The image decoding method includes a step of comparing block vector information included in a history-based candidate list with a block vector of a neighboring block used as an intra block copy (IBC) block vector candidate for IBC prediction of a current block, and a step of adding the block vector information included in the history-based candidate list to an IBC block vector candidate list based on the (Continued)

comparing. The step of comparing is performed only with respect to a candidate lastly included in the history-based candidate list.

17 Claims, 23 Drawing Sheets

(51) Int. Cl.
    *H04N 19/139* (2014.01)
    *H04N 19/169* (2014.01)
    *H04N 19/176* (2014.01)
    *H04N 19/52* (2014.01)
(52) U.S. Cl.
    CPC ....... *H04N 19/176* (2014.11); *H04N 19/1883* (2014.11); *H04N 19/52* (2014.11)

(56) References Cited

U.S. PATENT DOCUMENTS

| | | | |
|---|---|---|---|
| 2015/0264383 A1 | 9/2015 | Cohen et al. | |
| 2017/0223379 A1 | 8/2017 | Chuang et al. | |
| 2018/0192069 A1 | 7/2018 | Chen et al. | |
| 2020/0036998 A1* | 1/2020 | Xu ......................... | H04N 19/52 |

FOREIGN PATENT DOCUMENTS

| | | |
|---|---|---|
| KR | 100772576 B1 | 11/2007 |
| WO | 2018/226015 A1 | 12/2018 |

OTHER PUBLICATIONS

Z. Zhang et al., Non-CE3: History-based intra most probable modes derivation, Joint Video Experts Team (JVET) of ITU-T SG 16 WP 3 and ISO/IEC JTC 1/SC 29/WG 11, Document: JVET-M0139, 13th Meeting: Marrakech, MA, Jan. 9-18, 2019.

Bross, Benjamin et al., "Versatile Video Coding (Draft 4)," Joint Video Experts Team (JVET) of ITU-T SG 16 WP 3 and ISO/IEC JTC 1/SC 29/WG 11, JVETM1001-v1, Jan. 2019.

Chen, Yi-Wen et al., "CE4-related: Modified History-based MVP to support parallel processing," Joint Video Experts Team (JVET) of ITU-T SG 16 WP 3 and ISO/IEC JTC 1/SC 29/WG 11. Oct. 2018. doc: JVET-L0106.

Bross, Benjamin et al., "Versatile Video Coding (Draft 8)," Joint Video Experts Team (JVET) of ITU-T SG 16 WP 3 and ISO/IEC JTC 1/SC 29/WG 11. Jan. 2020. doc: JVET-Q2001-vD.

* cited by examiner

FIG. 2

0:Planar
1:DC

| HO | H1 | H2 | H3 | H4 |
|----|----|----|----|----|

ORDER OF ADDITION OF CANDIDATES IN CANDIDATE
LIST TO INTRA PREDICTION MODE CANDIDATE LIST,
MOTION VECTOR CANDIDATE LIST AND
MERGE CANDIDATE LIST (FROM HO TO H4)

ORDER OF ADDITION OF CANDIDATES IN CANDIDATE
LIST TO INTRA PREDICTION MODE CANDIDATE LIST,
MOTION VECTOR CANDIDATE LIST AND
MERGE CANDIDATE LIST (FROM H4 TO H0)

ORDER OF ADDITION OF CANDIDATES IN HISTORY-BASED
CANDIDATE LIST TO IBC BLOCK VECTOR PREDICTION
CANDIDATE LIST AND IBC MERGE
CANDIDATE LIST (FROM H0 TO H4)

ORDER OF ADDITION OF CANDIDATES IN HISTORY-BASED
CANDIDATE LIST TO IBC BLOCK VECTOR
PREDICTION CANDIDATE LIST AND IBC
MERGE CANDIDATE LIST (FROM H4 TO H0)

FIG. 31

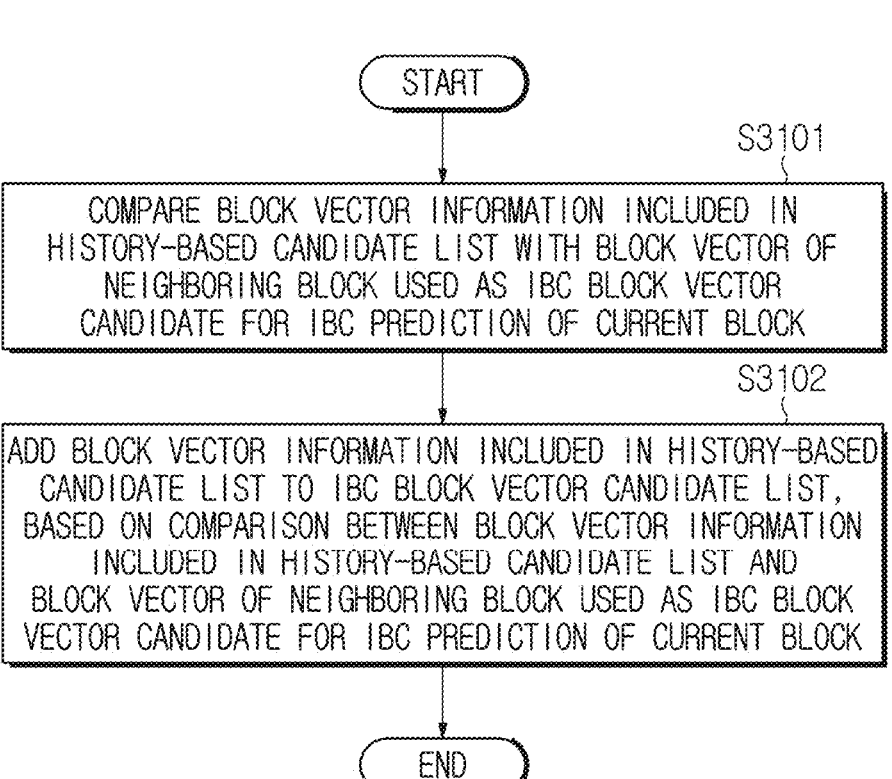

START

COMPARE BLOCK VECTOR INFORMATION INCLUDED IN
HISTORY-BASED CANDIDATE LIST WITH BLOCK VECTOR OF
NEIGHBORING BLOCK USED AS IBC BLOCK VECTOR
CANDIDATE FOR IBC PREDICTION OF CURRENT BLOCK

S3101

ADD BLOCK VECTOR INFORMATION INCLUDED IN HISTORY-BASED
CANDIDATE LIST TO IBC BLOCK VECTOR CANDIDATE LIST,
BASED ON COMPARISON BETWEEN BLOCK VECTOR INFORMATION
INCLUDED IN HISTORY-BASED CANDIDATE LIST AND
BLOCK VECTOR OF NEIGHBORING BLOCK USED AS IBC BLOCK
VECTOR CANDIDATE FOR IBC PREDICTION OF CURRENT BLOCK

S3102

END

FIG. 32

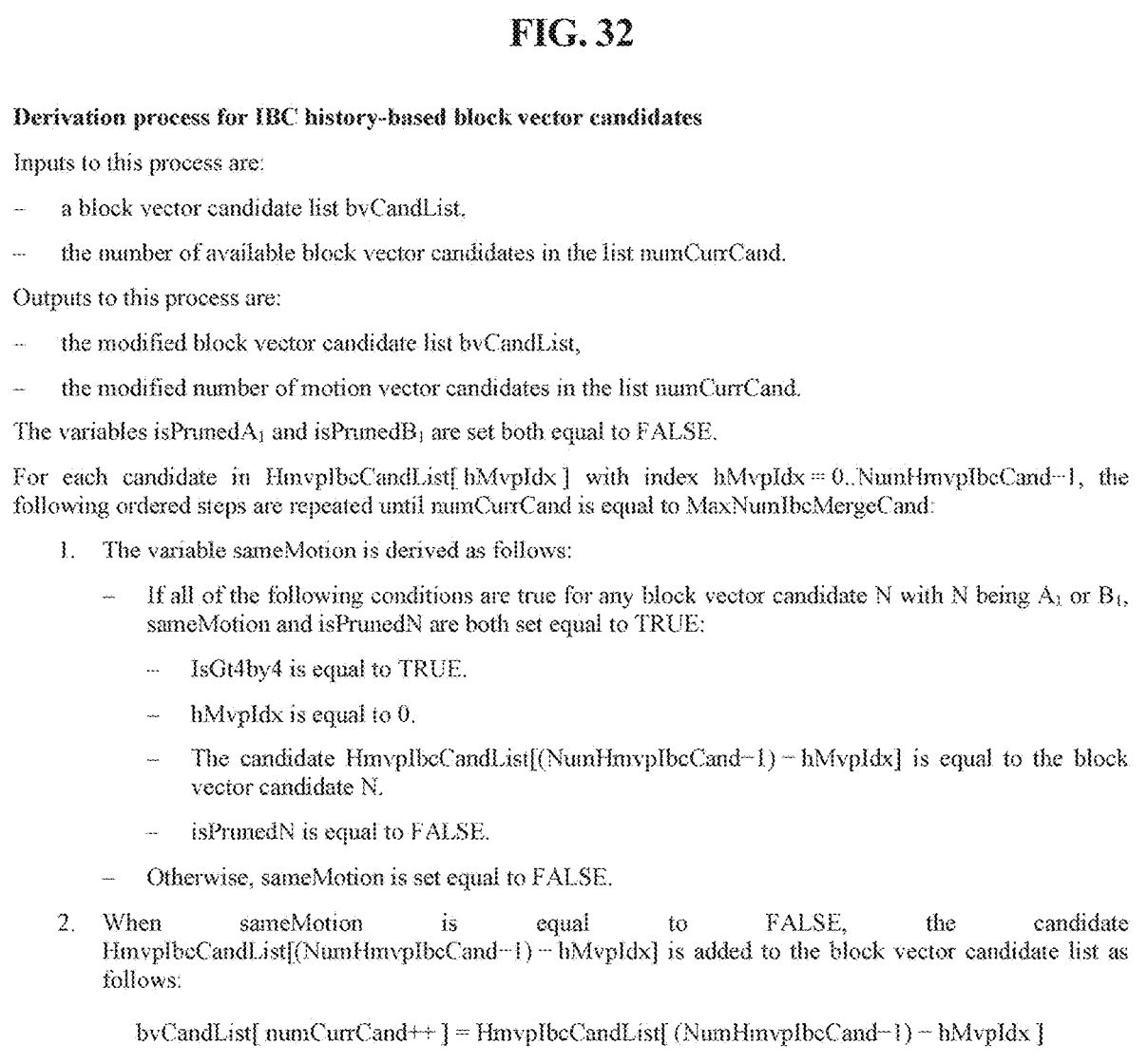

Derivation process for IBC history-based block vector candidates

Inputs to this process are:

--    a block vector candidate list bvCandList,

--    the number of available block vector candidates in the list numCurrCand.

Outputs to this process are:

--    the modified block vector candidate list bvCandList,

--    the modified number of motion vector candidates in the list numCurrCand.

The variables isPrunedA$_1$ and isPrunedB$_1$ are set both equal to FALSE.

For each candidate in HmvpIbcCandList[ hMvpIdx ] with index hMvpIdx = 0..NumHmvpIbcCand−1, the following ordered steps are repeated until numCurrCand is equal to MaxNumIbcMergeCand:

1.    The variable sameMotion is derived as follows:

--    If all of the following conditions are true for any block vector candidate N with N being A$_1$ or B$_1$, sameMotion and isPrunedN are both set equal to TRUE:

--    IsGt4by4 is equal to TRUE.

--    hMvpIdx is equal to 0.

--    The candidate HmvpIbcCandList[(NumHmvpIbcCand−1) − hMvpIdx] is equal to the block vector candidate N.

--    isPrunedN is equal to FALSE.

--    Otherwise, sameMotion is set equal to FALSE.

2.    When sameMotion is equal to FALSE, the candidate HmvpIbcCandList[(NumHmvpIbcCand−1) − hMvpIdx] is added to the block vector candidate list as follows:

bvCandList[ numCurrCand++ ] = HmvpIbcCandList[ (NumHmvpIbcCand−1) − hMvpIdx ]

FIG. 33

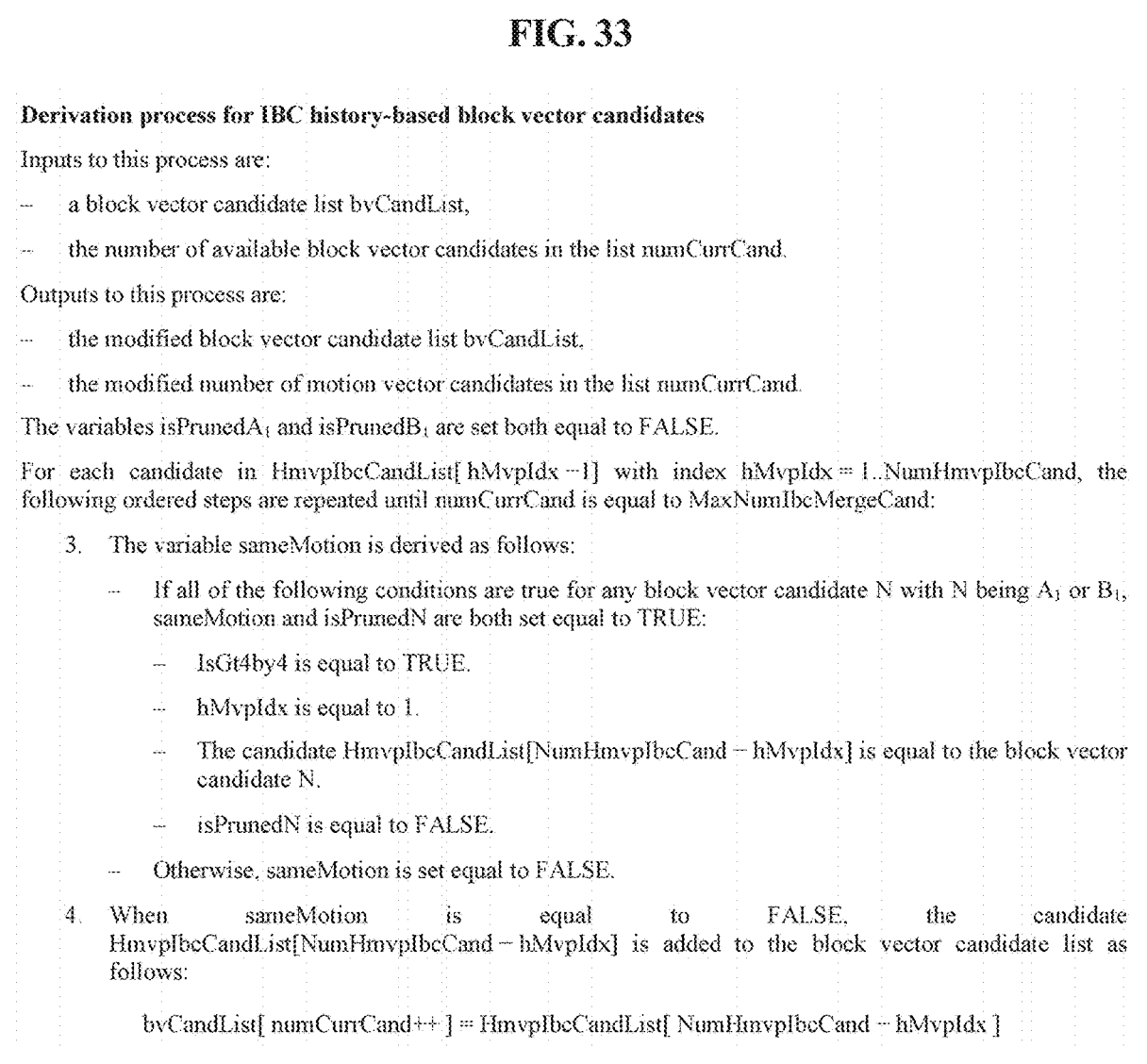

Derivation process for IBC history-based block vector candidates

Inputs to this process are:

-- a block vector candidate list bvCandList,

-- the number of available block vector candidates in the list numCurrCand.

Outputs to this process are:

-- the modified block vector candidate list bvCandList,

-- the modified number of motion vector candidates in the list numCurrCand.

The variables isPrunedA$_1$ and isPrunedB$_1$ are set both equal to FALSE.

For each candidate in HmvpIbcCandList[ hMvpIdx −1] with index hMvpIdx = 1..NumHmvpIbcCand, the following ordered steps are repeated until numCurrCand is equal to MaxNumIbcMergeCand:

3. The variable sameMotion is derived as follows:

-- If all of the following conditions are true for any block vector candidate N with N being A$_1$ or B$_1$, sameMotion and isPrunedN are both set equal to TRUE:

-- IsGt4by4 is equal to TRUE.

-- hMvpIdx is equal to 1.

-- The candidate HmvpIbcCandList[NumHmvpIbcCand − hMvpIdx] is equal to the block vector candidate N.

-- isPrunedN is equal to FALSE.

-- Otherwise, sameMotion is set equal to FALSE.

4. When sameMotion is equal to FALSE, the candidate HmvpIbcCandList[NumHmvpIbcCand − hMvpIdx] is added to the block vector candidate list as follows:

bvCandList[ numCurrCand++ ] = HmvpIbcCandList[ NumHmvpIbcCand − hMvpIdx ]

FIG. 34

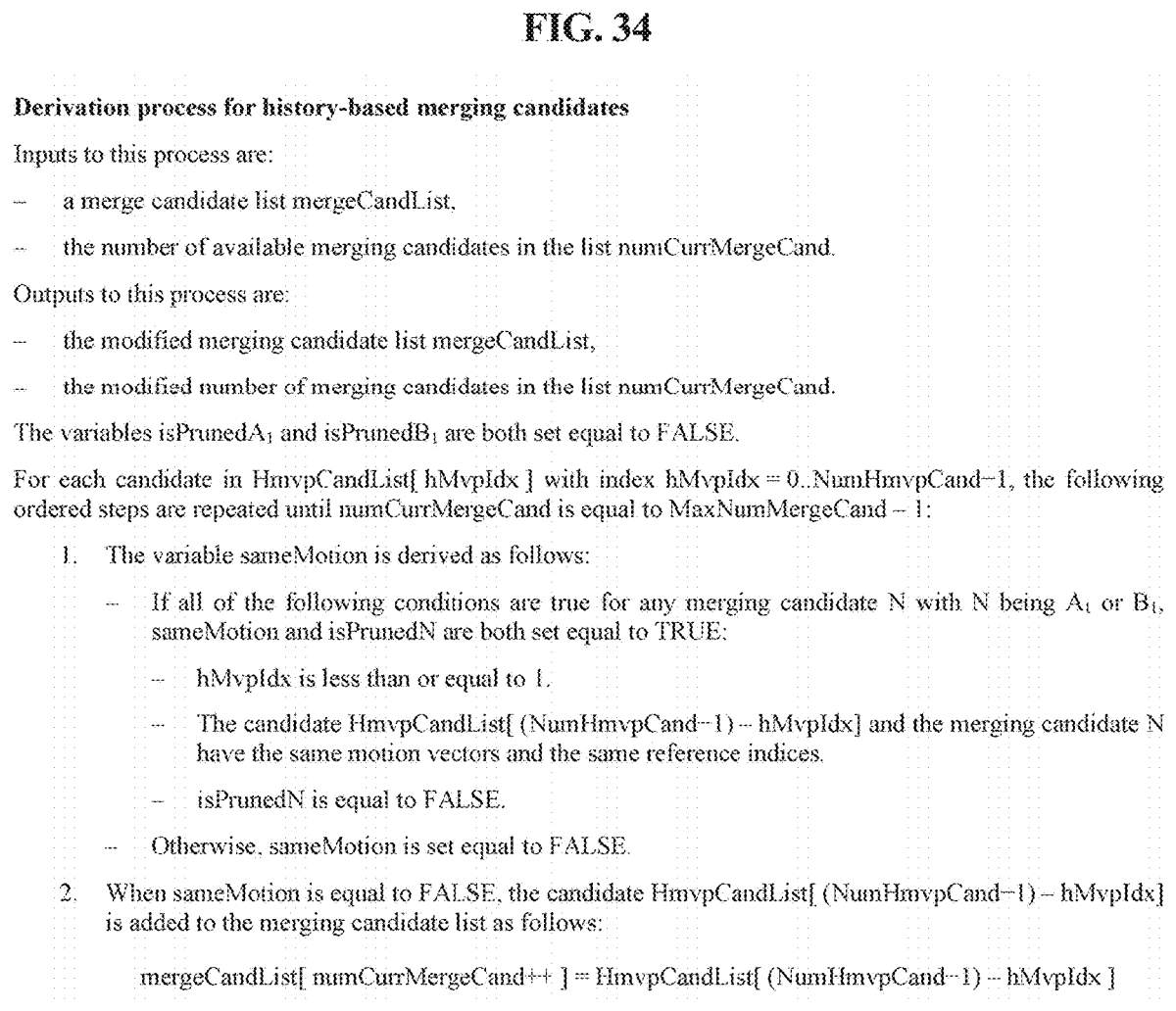

Derivation process for history-based merging candidates

Inputs to this process are:

– a merge candidate list mergeCandList,

– the number of available merging candidates in the list numCurrMergeCand.

Outputs to this process are:

– the modified merging candidate list mergeCandList,

– the modified number of merging candidates in the list numCurrMergeCand.

The variables isPrunedA$_1$ and isPrunedB$_1$ are both set equal to FALSE.

For each candidate in HmvpCandList[ hMvpIdx ] with index hMvpIdx = 0..NumHmvpCand−1, the following ordered steps are repeated until numCurrMergeCand is equal to MaxNumMergeCand − 1:

1.  The variable sameMotion is derived as follows:

–  If all of the following conditions are true for any merging candidate N with N being A$_1$ or B$_1$, sameMotion and isPrunedN are both set equal to TRUE:

–  hMvpIdx is less than or equal to 1.

–  The candidate HmvpCandList[ (NumHmvpCand−1) − hMvpIdx] and the merging candidate N have the same motion vectors and the same reference indices.

–  isPrunedN is equal to FALSE.

–  Otherwise, sameMotion is set equal to FALSE.

2.  When sameMotion is equal to FALSE, the candidate HmvpCandList[ (NumHmvpCand−1) − hMvpIdx] is added to the merging candidate list as follows:

mergeCandList[ numCurrMergeCand++ ] = HmvpCandList[ (NumHmvpCand−1) − hMvpIdx ]

FIG. 35

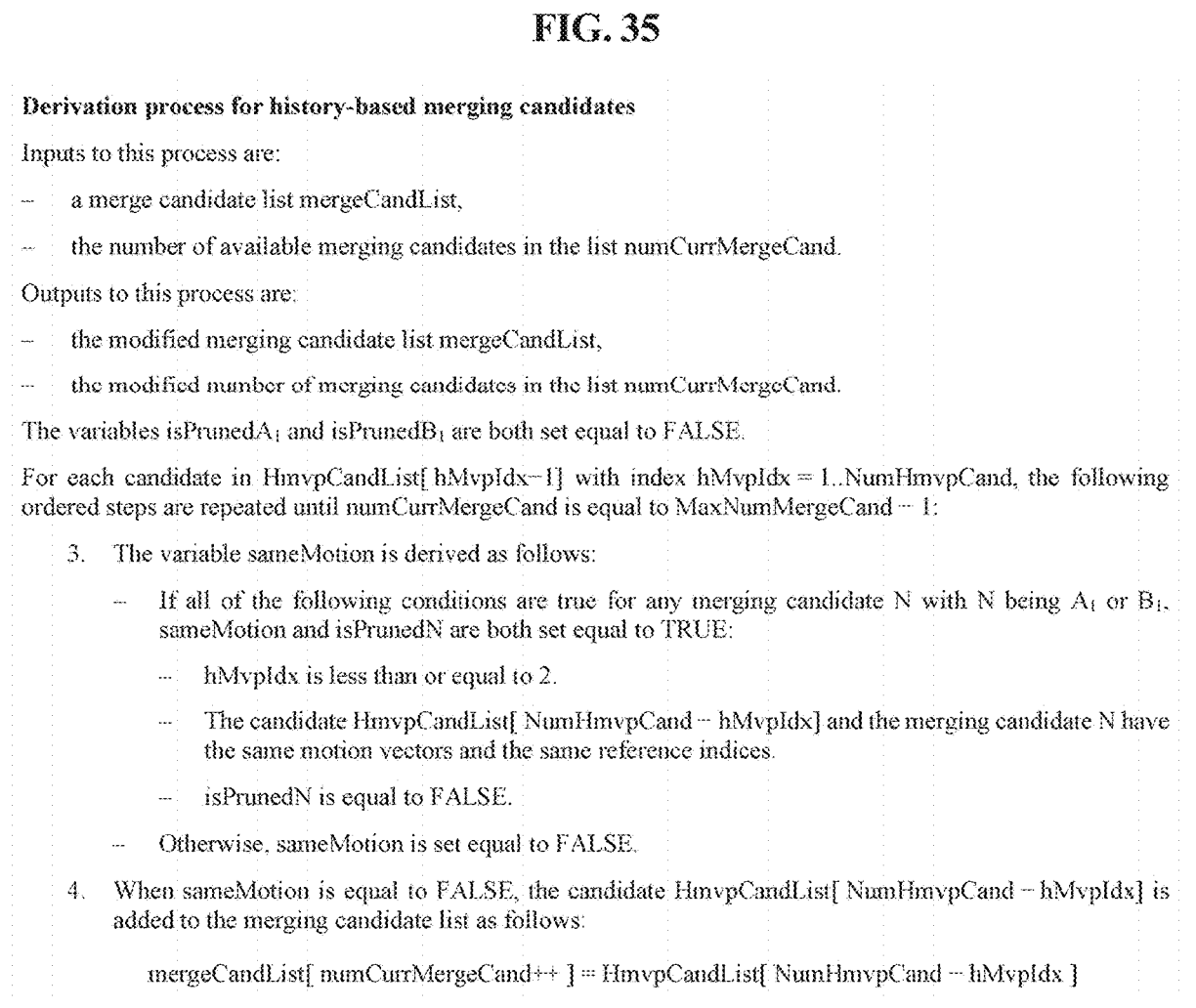

Derivation process for history-based merging candidates

Inputs to this process are:

- a merge candidate list mergeCandList,

- the number of available merging candidates in the list numCurrMergeCand.

Outputs to this process are:

- the modified merging candidate list mergeCandList,

- the modified number of merging candidates in the list numCurrMergeCand.

The variables isPrunedA$_1$ and isPrunedB$_1$ are both set equal to FALSE.

For each candidate in HmvpCandList[ hMvpIdx−1] with index hMvpIdx = 1..NumHmvpCand, the following ordered steps are repeated until numCurrMergeCand is equal to MaxNumMergeCand − 1:

3. The variable sameMotion is derived as follows:

- If all of the following conditions are true for any merging candidate N with N being A$_1$ or B$_1$, sameMotion and isPrunedN are both set equal to TRUE:

- hMvpIdx is less than or equal to 2.

- The candidate HmvpCandList[ NumHmvpCand − hMvpIdx] and the merging candidate N have the same motion vectors and the same reference indices.

- isPrunedN is equal to FALSE.

- Otherwise, sameMotion is set equal to FALSE.

4. When sameMotion is equal to FALSE, the candidate HmvpCandList[ NumHmvpCand − hMvpIdx] is added to the merging candidate list as follows:

mergeCandList[ numCurrMergeCand++ ] = HmvpCandList[ NumHmvpCand − hMvpIdx ]

1

IMAGE ENCODING/DECODING METHOD AND APPARATUS, AND RECORDING MEDIUM STORING BITSTREAM

CROSS-REFERENCE TO RELATED APPLICATIONS

This application is a continuation application of U.S. application Ser. No. 17/437,356, filed on Sep. 8, 2021, which is a National Stage of International Application No. PCT/KR2020/003211, filed on Mar. 6, 2020, which claims priority to Korean Patent Application No. 10-2019-0026790, filed on Mar. 8, 2019, with the Korean Intellectual Property Office, which are incorporated herein by reference in their entirety.

TECHNICAL FIELD

The present invention relates to an image encoding/decoding method and apparatus, and a recording medium for storing a bitstream. More particularly, the present invention relates to a method of encoding and decoding an image using a candidate list.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy encoding technique of allocating frequently occurring pixel values with shorter codes and less occurring pixel values with longer codes.

DISCLOSURE

Technical Problem

An object of the present invention is to provide an image encoding/decoding method and apparatus with improved encoding/decoding efficiency.

Another object of the present invention is to provide an image encoding/decoding method and apparatus capable of improving image compression efficiency using a candidate list.

Another object of the present invention is to provide a recording medium for storing a bitstream generated by an image decoding method or apparatus according to the present invention.

Technical Solution

A method of decoding an image according to an embodiment of the present invention includes a step of comparing block vector information included in a history-based candidate list with a block vector of a neighboring block used as an intra block copy (IBC) block vector candidate for IBC prediction of a current block, and a step of adding the block vector information included in the history-based candidate list to an IBC block vector candidate list based on the comparing. The step of comparing is performed only with respect to a candidate lastly included in the history-based candidate list.

In the image decoding method, the step of comparing may be performed only when an area of the current block is greater than 16.

In the image decoding method, the step of adding may include adding the block vector information included in the history-based candidate list to the IBC block vector candidate list, when the block vector information included in the history-based candidate list and the block vector of the neighboring block are different as a result of comparing.

In the image decoding method, the step of comparing may be performed only when the number of IBC block vector candidates included in the IBC block vector candidate list is less than a maximum number of merge candidates which can be included in the IBC block vector candidate list.

In the image decoding method, the step of adding may be performed until the number of IBC block vector candidates included in the IBC block vector candidate list reaches the maximum number of merge candidates which can be included in the IBC block vector candidate list.

In the image decoding method, the maximum number of merge candidates which can be included in the IBC block vector candidate list may be determined based on a coding parameter.

In the image decoding method, the neighboring block may include at least one of a block adjacent to a left side of the current block or a block adjacent to an upper side of the current block.

In the image decoding method, the history-based candidate list may include block vector information of a block decoded before decoding of the current block.

The image decoding method may further include a step of adding block vector information of the current block to the history-based candidate list.

In the image decoding method, when the block decoded before decoding of the current block and the current block belong to different coding tree unit (CTU) rows, the block vector information of the current block may not be added to the history-based candidate list.

A method of encoding an image according to an embodiment of the present invention includes a step of comparing block vector information included in a history-based candidate list with a block vector of a neighboring block used as an intra block copy (IBC) block vector candidate for IBC prediction of a current block, and a step of adding the block vector information included in the history-based candidate list to an IBC block vector candidate list based on the comparing. The step of comparing is performed only with respect to a candidate lastly included in the history-based candidate list.

In the image encoding method, the step of comparing may be performed only when an area of the current block is greater than 16.

In the image encoding method, the step of adding may include adding the block vector information included in the history-based candidate list to the IBC block vector candidate list, when the block vector information included in the history-based candidate list and the block vector of the neighboring block are different as a result of comparing.

In the image encoding method, the step of comparing may be performed only when the number of IBC block vector candidates included in the IBC block vector candidate list is less than a maximum number of merge candidates which can be included in the IBC block vector candidate list.

In the image encoding method, the step of adding may be performed until the number of IBC block vector candidates included in the IBC block vector candidate list reaches the maximum number of merge candidates which can be included in the IBC block vector candidate list.

In the image encoding method, the maximum number of merge candidates which can be included in the IBC block vector candidate list may be determined based on a coding parameter.

In the image encoding method, the neighboring block may include at least one of a block adjacent to a left side of the current block or a block adjacent to an upper side of the current block.

In the image encoding method, the history-based candidate list may include block vector information of a block encoded before encoding of the current block, and the image encoding method may further include a step of adding the block vector information of the current block to the history-based candidate list.

In the image encoding method, when the block encoded before encoding of the current block and the current block belong to different coding tree unit (CTU) rows, the block vector information of the current block may not be added to the history-based candidate list.

In a non-transitory computer-readable recording medium for storing a bitstream generated by an image encoding method according to an embodiment of the present invention, the image encoding method includes a step of comparing block vector information included in a history-based candidate list with a block vector of a neighboring block used as an intra block copy (IBC) block vector candidate for IBC prediction of a current block, and a step of adding the block vector information included in the history-based candidate list to an IBC block vector candidate list based on the comparing. The step of comparing performed only with respect to a candidate lastly included in the history-based candidate list.

Advantageous Effects

According to the present invention, it is possible to provide an image encoding/decoding method and apparatus with improved encoding/decoding efficiency.

According to the present invention, it is possible to provide an image encoding/decoding method and apparatus capable of improving encoding/decoding efficiency using a candidate list.

According to the present invention, it is possible to provide a recording medium for storing a bitstream generated by an image encoding method or apparatus according to the present invention.

According to the present invention, it is possible to provide a recording medium for storing a bitstream received and decoded by an image decoding apparatus according to the present invention and used to reconstruct an image.

DESCRIPTION OF DRAWINGS

FIG. 2 is a block diagram showing a configuration of a decoding apparatus according to an embodiment and to which the present invention is applied.

FIG. 20 is a view illustrating a method of adding a neighboring block to a candidate list in consideration of the encoding/decoding order of the neighboring block, according to an embodiment of the present invention.

FIG. 21 is a view illustrating a method of adding a neighboring block to a candidate list in consideration of the position of the neighboring block located at a specific distance from the position of a current block, according to an embodiment of the present invention.

FIG. 31 is a view illustrating an image coding method according to an embodiment of the present invention.

FIG. 32 is a view illustrating an embodiment of constructing an IBC block vector candidate list using a history-based candidate list, according to an embodiment of the present invention.

FIG. 33 is a view illustrating an embodiment of a method of constructing an IBC block vector candidate list using a history-based candidate list, according to an embodiment of the present invention.

FIG. 34 is a view illustrating an embodiment of a method of constructing a merge candidate list using a history-based candidate list, according to an embodiment of the present invention.

FIG. 35 is a view illustrating an embodiment of a method of constructing a merge candidate list using a history-based candidate list, according to an embodiment of the present invention.

MODE FOR INVENTION

Figure 1:
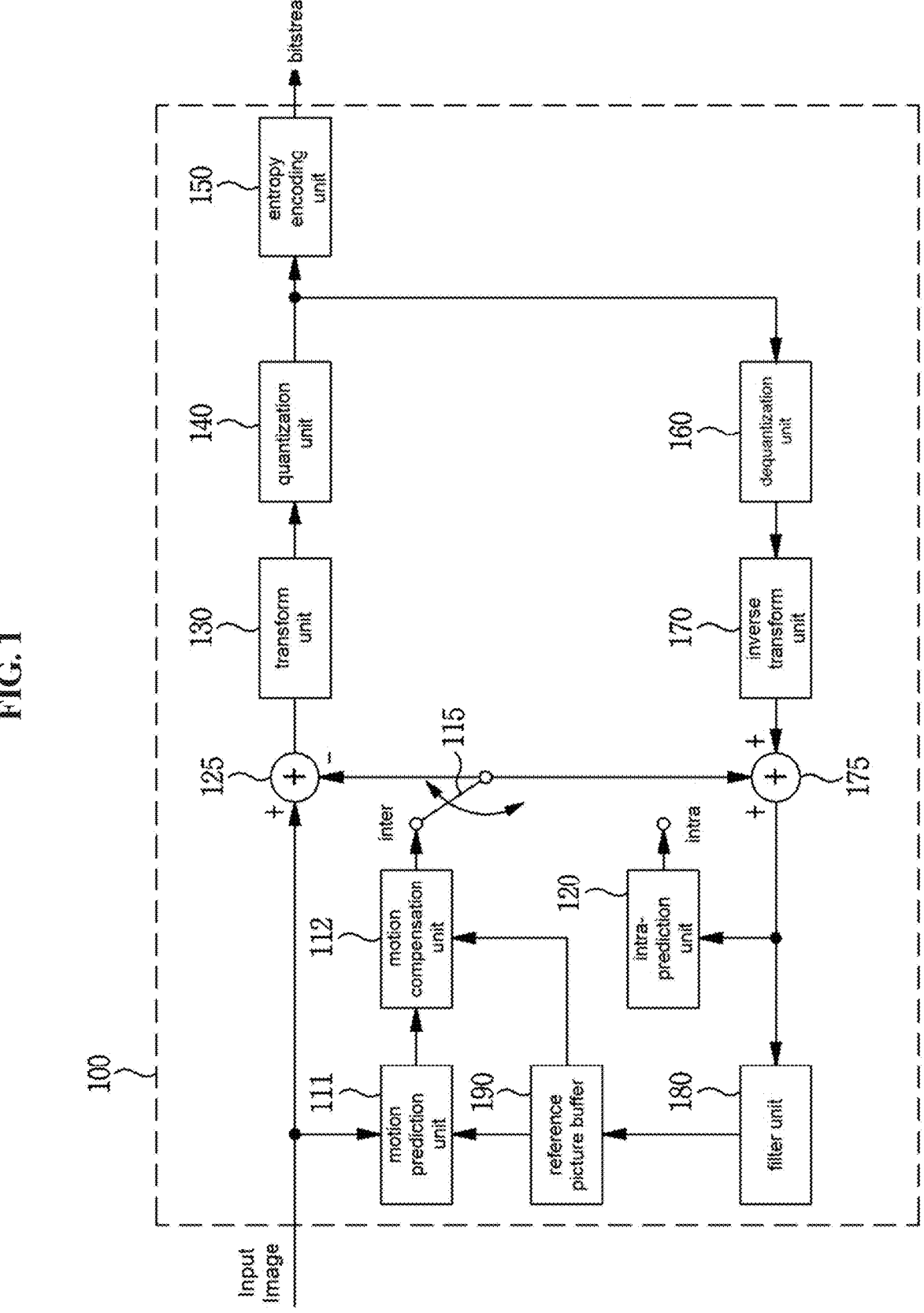
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the encoder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode(intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
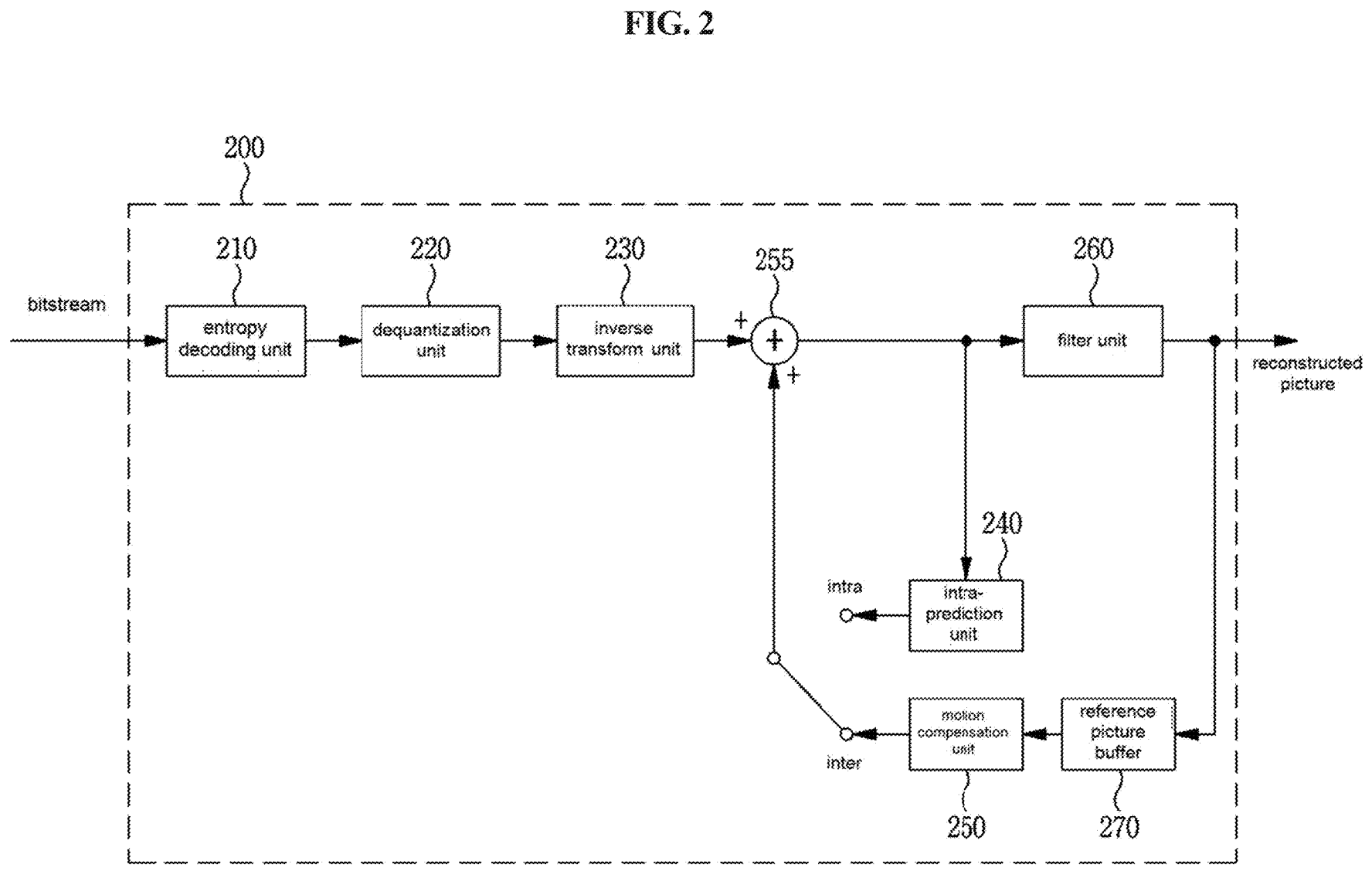

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level(quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
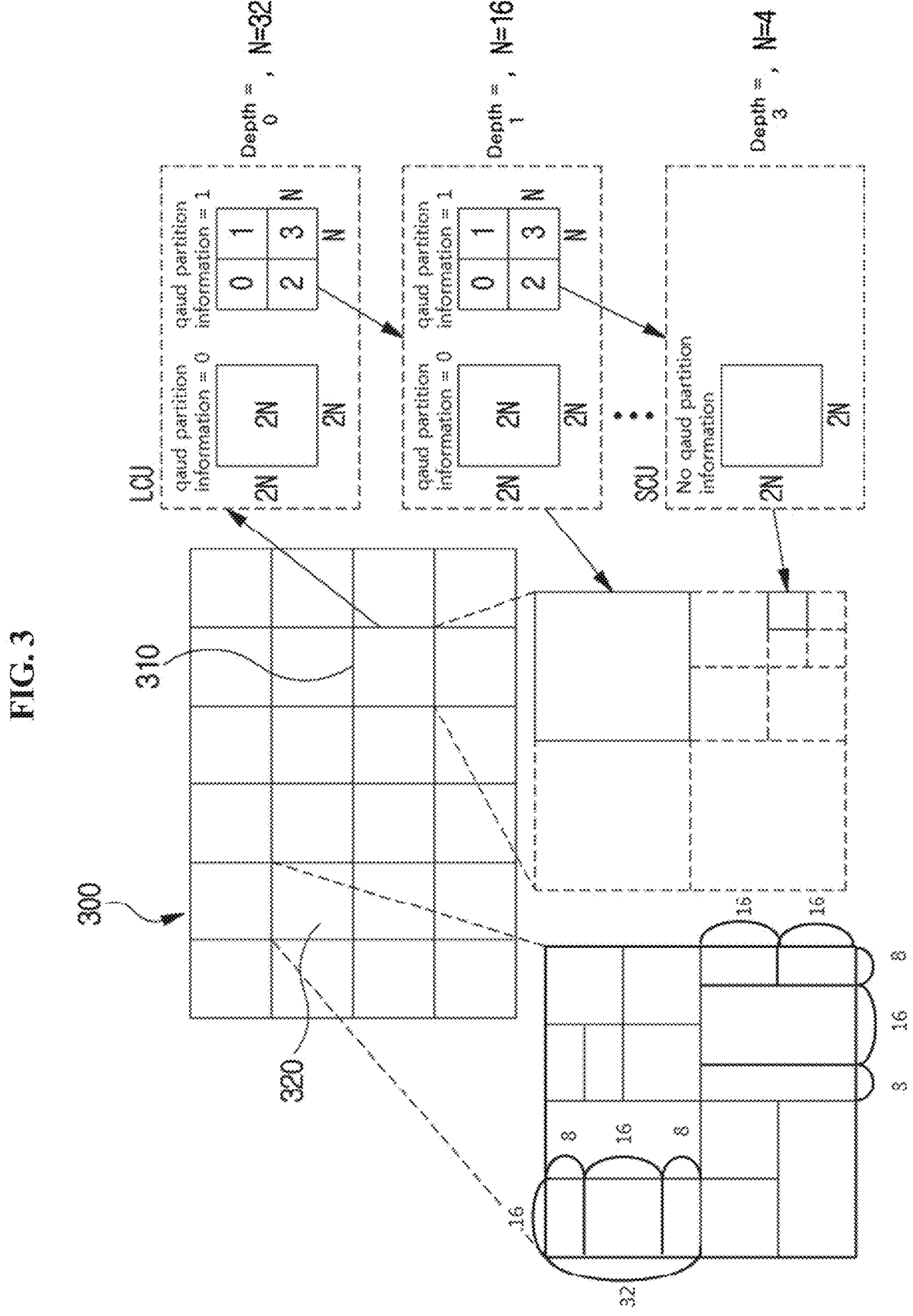
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to anode of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
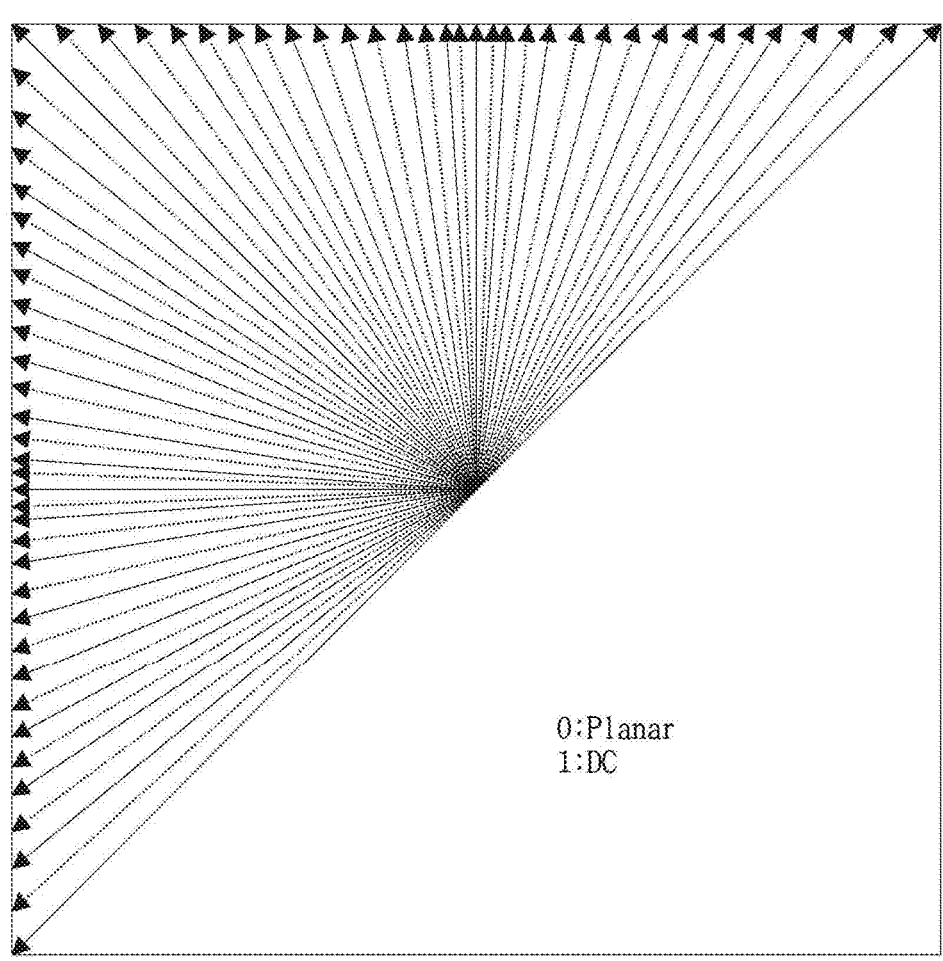
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
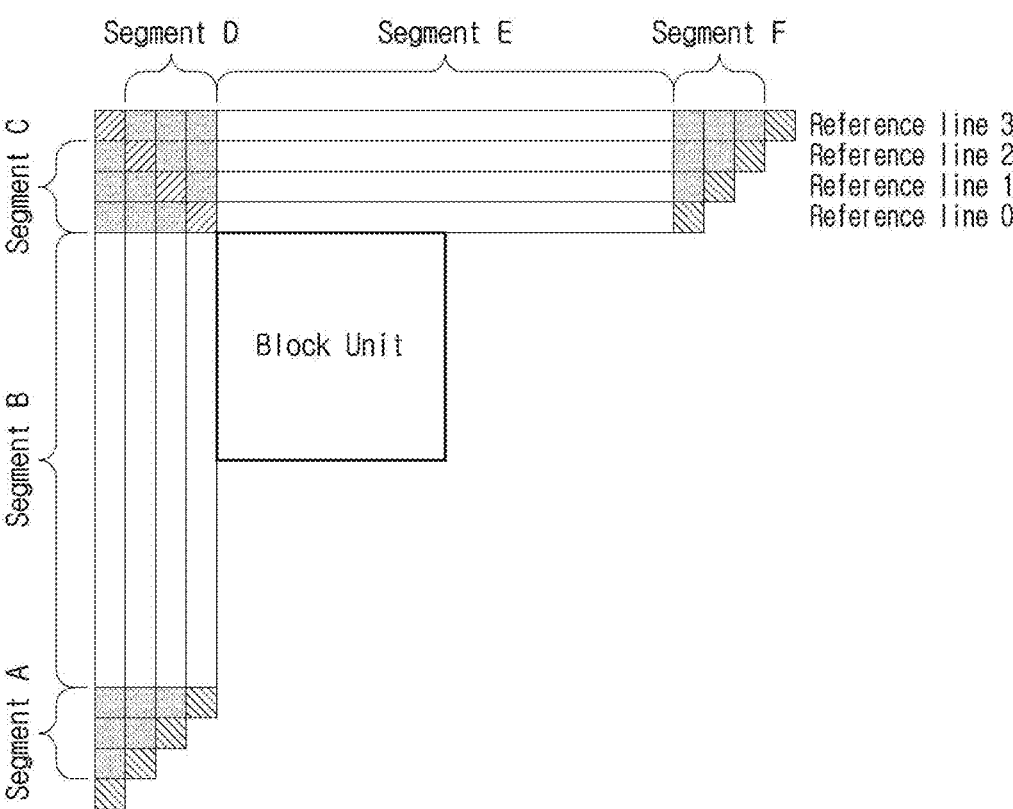
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto.

For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
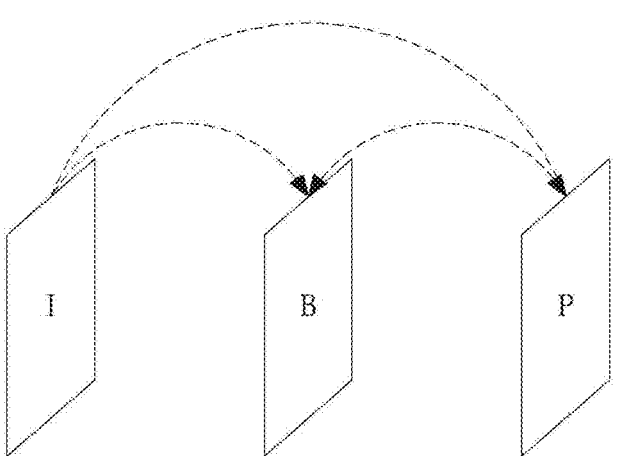
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
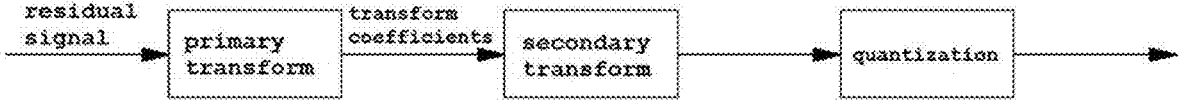
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Kar-hunen-Loeve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (BC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the encoding/decoding order. By limiting the value of the block vector in this way, memory consumption and device complexity according to the IBC mode implementation may be reduced.

Hereinafter, an image encoding/decoding method according to an embodiment of the present invention will be described with reference to FIGS. 8 to 35.

The embodiments described below relate to a method of determining a reference block for a current block, and an image may be coded/decoded according to a combination of at least one of the following embodiments. According to the following embodiments of the present invention, the reference block for the current block may be efficiently determined in an image encoding/decoding process, thereby improving coding efficiency of an image encoder.

In this specification, a block may mean a unit. In addition, a candidate list means a candidate set and may include at least one candidate.

Determination of the reference block for the current block according to an embodiment of the present invention may be performed in at least one of image encoding/decoding processes including inter prediction, intra prediction, transformation, inverse transformation, quantization, dequantization, entropy encoding/decoding and/or in-loop filtering.

In this specification, an IBC motion vector may have the same meaning as an IBC block vector.

In addition, in this specification, an IBC motion vector candidate list may have the same meaning as an IBC block vector prediction candidate list.

In addition, in this specification, the IBC block vector prediction candidate list and/or an IBC merge candidate list may have the same meaning as the IBC block vector candidate list.

Image encoding/decoding according to the present invention may be performed by step of including a neighbor block in a candidate list and/or step of determining a reference block for a current block from the candidate list.

The reference block for the current block may be determined from the candidate list including neighbor blocks or block information of the neighbor blocks. In at least one of inter prediction, intra prediction, transformation, inverse transformation, quantization, dequantization, entropy encoding/decoding or in-loop filter, which are image encoding/decoding processes, the current block may be coded/decoded using the determined reference block.

The reference block may mean at least one of the block information of the reference blocks. That is, the determined block information of the reference blocks may be used for the current block to perform at least one of the image encoding/decoding process. At this time, the block information of the reference blocks may be determined as the block information of the current block. Accordingly, the reference block described below may mean at least one of the block information of the reference blocks.

At this time, at least one of a neighbor block included in the candidate list and/or neighbor block information included in the candidate list may mean a candidate.

In addition, at least one of a block included in the candidate list and/or block information of the block included in the candidate list may mean a candidate.

That is, the block may mean a candidate which is a block itself or mean at least one candidate of the information on the block. Accordingly, in the following embodiment, the block and the information on the block may be collectively referred to as a block.

The information on the block may mean at least one of information on the neighbor block, information on the reference block or information on the current block.

In addition, the information on the block may include at least one of coding parameters.

In addition, the information on the block may include at least one piece of information used in inter prediction, intra prediction, transformation, inverse transformation, quantization, dequantization, entropy encoding/decoding or in-loop filter.

That is, the information on the block may mean at least one of a block size, a block depth, block partitioning information, a block form(square or rectangle), whether partitioning is performed in the form of a quadtree, whether partitioning is performed in the form of a binary tree, a partitioning direction (a horizontal or vertical direction) of a binary tree, a partitioning form(symmetric or asymmetric partitioning) of a binary tree, a prediction mode (e.g., an intra prediction mode or an inter prediction mode), an intra luma prediction mode/direction, an intra chroma prediction mode/direction, intra partitioning information, inter partitioning information, a coding block partitioning flag, a prediction block partitioning flag, a transform block partitioning flag, a reference sample filter tab, a reference sample filter coefficient, a prediction block filter tab, a prediction block filter coefficient, a prediction block boundary filter tab, a prediction block boundary filter coefficient, a motion vector (e.g., a motion vector of at least one of L0, L1, L2, L3, etc.), a motion vector difference (e.g., a motion vector difference of at least one of L0, L1, L2, L3, etc.), an inter prediction direction (an inter prediction direction of at least one of unidirectional prediction or bidirectional prediction), a reference image index (e.g., a reference image index of at least one of L0, L1, L2, L3, etc.), an inter prediction indicator, a prediction list utilization flag, a reference image list, a motion vector prediction index, a motion vector prediction candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector (a motion vector presentation unit such as integer sample, ½ sample, ¼ sample, ⅛ sample, 1/16 sample, 1/32 sample, etc.), an IBC motion vector, an IBC motion vector difference, an IBC motion vector index, an IBC motion vector prediction candidate, an IBC motion vector candidate list, an IBC merge candidate list, a weight of each block when both prediction blocks are generated, a transform type, a transform size, information on whether to use primary transform, information on whether to use secondary transform, a primary transform index, a secondary transform index, information on whether there is a residual signal, a coding block pattern, a coding block flag, a quantization parameter, a residual quantization parameter, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to an adaptive loop filter, an adaptive loop filter coefficient, an adaptive loop filter tab, an adaptive loop filter shape/form, a binarization/inverse-binarization method, a context model determination method, a context model update method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, the number of times of a motion vector search at a decoder side, information on a CTU size, information on a minimum block size, information on a maximum block size, maximum block depth information, minimum block depth information, slice identification information, slice partitioning information, tile identification information, a tile type, tile partitioning information, tile group identification information, a tile group type, tile group partition information, an input sample bit depth, a reconstruction sample bit depth, a residual sample bit depth, a transform coefficient bit depth, or a quantization level bit depth, or a combination thereof.

According to an embodiment of the present invention, the neighbor block may be included in the candidate list.

At least one or up to V of the neighbor blocks spatially/temporally adjacent to the current block may be included in the candidate list of the current block.

In addition, at least one piece or up to V pieces of block information of the neighbor blocks spatially/temporally adjacent to the current block may be included in the candidate list of the current block.

At this time, V may be a positive integer including 0. In addition, V may be determined based on at least one of the coding parameter of the current block or the coding parameter of the candidate. In addition, V may be predetermined in a encoder/decoder or may be signaled from the encoder to the decoder.

When the neighbor block is included in the same image (picture) as the current block, a sub-picture in the same image, a slice in the same image, a tile in the same image, a brick in the same image, a CTU in the same image, etc., the neighbor block at this time may be referred to as a neighbor block spatially adjacent to the current block.

In addition, when the neighbor block is included in an image different from the current block, a sub-picture in the different image, a slice in the different image, a tile in the different image, in a brick in the different image, a CTU in the different image, etc., the neighbor block may be referred to as a neighbor block temporally adjacent to the current block.

Hereinafter, a method of adding a spatial or temporal neighbor block to a candidate list will be described in detail. The encoder/decoder may include the spatial or temporal neighbor block of the current block in the candidate list of the current block using at least one of the following methods or a combination thereof.

Figure 8:
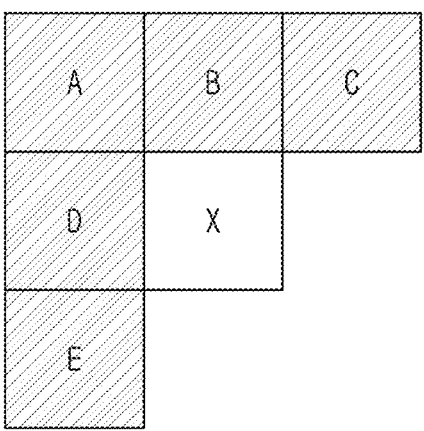
FIGS. 8 and 9 are views illustrating a method of adding a neighboring block adjacent to a current block to a candidate list according to an embodiment of the present invention.
Figure 9:
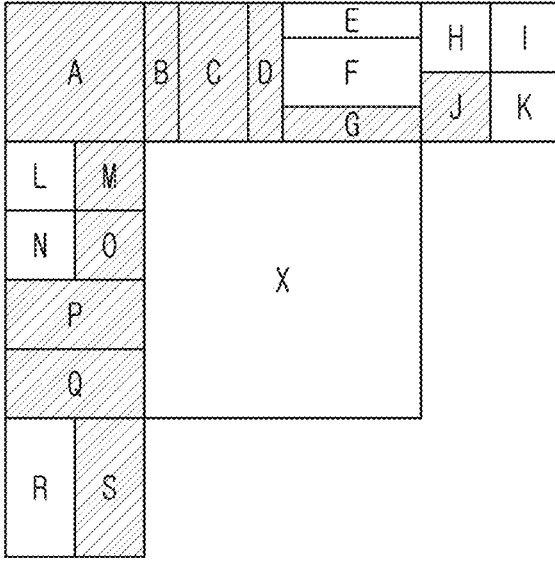

FIGS. 8 and 9 are views illustrating a method of adding a neighbor block adjacent to a current block to a candidate list according to an embodiment of the present invention.

Up to V of the neighbor blocks adjacent to the current block may be included in the candidate list of the current block. Here, V may be a positive integer including 0. At this time, the neighbor block being adjacent to the current block may mean that at least one of the boundary or vertex of the current block is in contact with or adjoins at least one of the boundary or the vertex of the neighbor block.

A block located within the height of the current block based on the upper position of the current block may be referred to as the neighbor block adjacent to the current block.

In addition, a block located in the width of the current block based on the left position of the current block may be referred to as the neighbor block adjacent to the current block.

The neighbor block may be included in the candidate list, in order from a neighbor block adjoining the boundary of the current block to a neighbor block adjoining the vertex of the current block.

Alternatively, the neighbor block may be included in the candidate list, in order from a neighbor block adjoining the vertex of the current block to a neighbor block adjoining the boundary of the current block.

The neighbor block may be included in the candidate list, in order from a neighbor block adjacent to the left side of the current block to a neighbor block adjacent to the upper end of the current block.

Alternatively, the neighbor block may be included in the candidate list, in order from a neighbor block adjacent to the upper end of the current block to a neighbor block adjacent to the left side of the current block.

Even when at least one block is present between the current block and the neighbor block, the neighbor block may be regarded as being adjacent to the current block.

For example, referring to FIG. 9, blocks E, F, H, I, K, L, N and R may also be adjacent to the current block X.

Gray blocks shown in FIGS. 8 and 9 may mean neighbor blocks which may be adjacent to the current block X and included in the candidate list.

For example, referring to FIG. 9, blocks B, C and D may mean blocks obtained by vertically partitioning one parent node into three partitioned trees.

In addition, blocks E, F and G may mean blocks obtained by horizontally partitioning one parent node into three partitioned trees.

In addition, blocks P and Q may mean blocks obtained by partitioning one parent node into horizontal binary trees.

In addition, blocks R and S may mean blocks obtained by partitioning one parent node into vertical binary trees.

In addition, blocks H, I, J and K and blocks L, M, N and O may mean blocks obtained by partitioning one parent mode to quad trees.

Examples of block partitioning may be commonly used in the following other drawings.

At this time, in the example of FIG. 8, the candidate list of the current block X may be constructed to include at least one of blocks {A, B, C, D, E} adjacent to the current block X.

In addition, in the example of FIG. 9, the candidate list of the current block X may be constructed to include at least one of blocks {A, B, C, D, G, J, M, O, P, Q, S} adjacent to the current block X.

Figure 10:
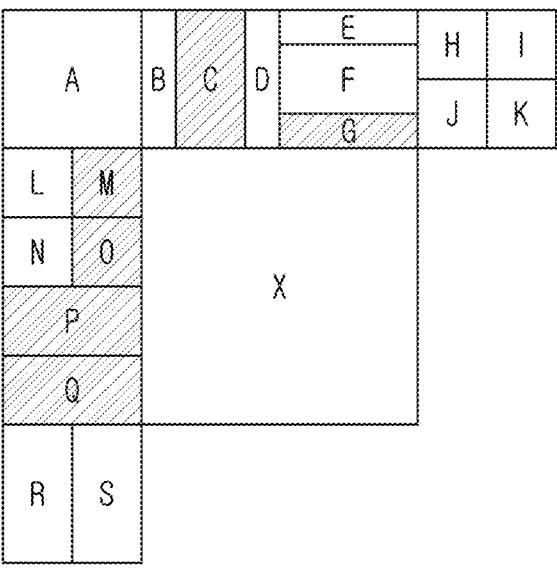
FIGS. 10 and 11 are views illustrating a method of adding a neighboring block to a candidate list in consideration of an adjoining length of a current block and the neighboring block, according to an embodiment of the present invention.
Figure 11:
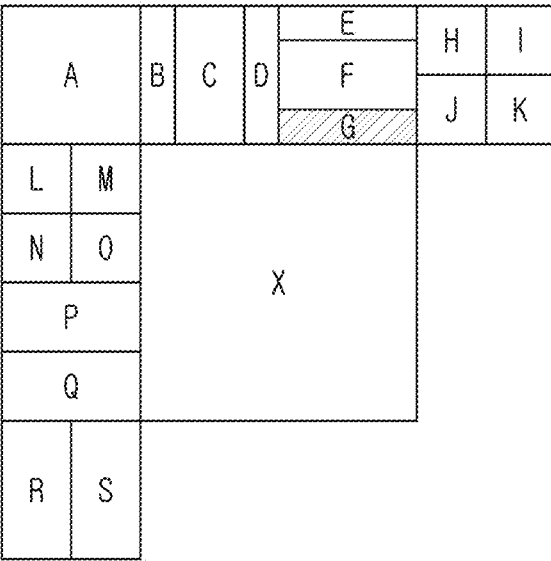

FIGS. 10 and 11 are views illustrating a method of adding a neighboring block to a candidate list in consideration of an adjoining length of a current block and the neighboring block, according to an embodiment of the present invention.

Depending on whether at least one of the neighboring blocks adjacent to the current block adjoins the current block, up to V of the neighboring blocks may be included in the candidate list of the current block.

For example, up to V of the neighboring blocks having adjoining lengths (widths or heights) with the current block, of N or more, among the neighboring blocks adjacent to the current block may be included in the candidate list of the current block.

At this time, N may mean a positive integer such as 2, 4, 8, 16, etc. In addition, N may be determined based on at least one of the coding parameter of the current block and the coding parameter of the candidate. In addition, N may be predetermined in the encoder/decoder or may be signaled from the encoder to the decoder.

If there is no neighboring block having an adjoining length with the current block, of N or more, among the neighboring blocks adjacent to the current block, (N−K) may be used instead of N to construct the candidate list of the current block. At this time, K may mean a positive integer greater than 0.

That is, up to V of the neighboring blocks each having an adjoining length with the current block, of (N−K) or more, among the neighboring blocks adjacent to the current block may be included in the candidate list of the current block.

In addition, the neighboring block may be included in the candidate list in order from a neighboring block having a large adjoining length with the current block to a neighboring block having a small adjoining length with the current block.

Alternatively, the neighboring block may be included in the candidate list in order from a neighboring block having a small adjoining length with the current block to a neighboring block having a large adjoining length with the current block.

In addition, up to V of the neighboring blocks each having an adjoining length with the current block, of N or more and M or less, among the neighboring blocks adjacent to the current block may be included in the candidate list of the current block. Here, M and N may mean positive integers which are square numbers of 2, such as 2, 4, 8 and 16.

Referring to FIG. 10, gray blocks shown in FIG. 10 adjoin the current block X by a length of N or more and thus may mean neighboring blocks which may be included in the candidate list.

For example, a block X may mean a 32×32 block, a block A may mean a 16×16 block, blocks B and D may mean 4×16 blocks, a block C may mean an 8×16 block, blocks E and G may mean 16×4 blocks, a block F may mean a 16×8 block, blocks H, I, J, K, L, M, N and O may mean 8×8 blocks, blocks P and Q may mean 16×8 blocks, and blocks R and S may mean 8×16 blocks. The examples of such block sizes may be commonly used in the drawings.

At this time, for example, at least one of neighboring blocks each having an adjoining length with the current block X, of 8 or more, may be included in the candidate list. That is, the candidate list of the current block X may be constructed to include at least one of blocks {C, G, M, O, P, Q}.

Referring to FIG. 11, gray blocks shown in FIG. 11 adjoin the current block X by a length of N or more and thus may mean neighboring blocks which may be included in the candidate list.

For example, neighboring blocks each having an adjoining length with the current block X of, 16 or more, may be included in the candidate list. That is, the candidate list of the current block X may be constructed to include a block {G}.

Figures 12, 13:
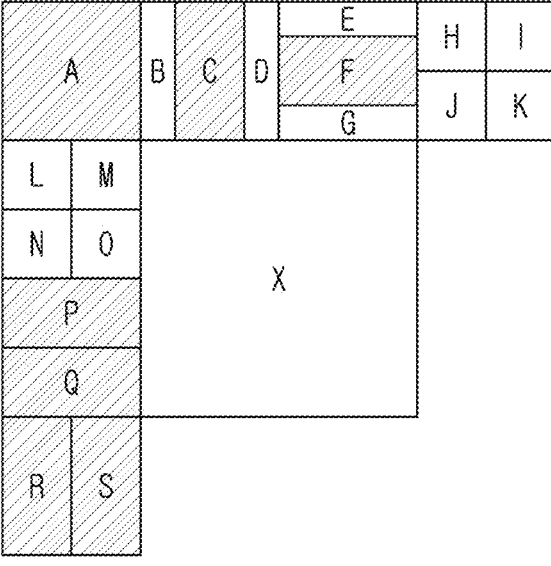
FIGS. 12 and 13 are views illustrating a method of adding a neighboring block to a candidate list in consideration of the size of the neighboring block, according to an embodiment of the present invention.

FIGS. 12 and 13 are views illustrating a method of adding a neighboring block to a candidate list in consideration of the size of the neighboring block, according to an embodiment of the present invention.

According to the sizes of the neighboring blocks adjacent to the current block, up to V of the neighboring blocks may be included in the candidate list of the current block. At this time, the size of the block may mean at least one of the width, height or area of the block.

For example, up to V of the neighboring blocks each having a size of M×N or more among the neighboring blocks adjacent to the current block may be included in the candidate list of the current block.

At this time, M may mean the width of the block, N may mean the height of the block, and M and N may be positive integers. In addition, M and N may be the same or different. In addition, at least one of M or N may be determined based on at least one of the coding parameter of the current block or the coding parameter of the candidate. In addition, at least one of M or N may be predetermined in the encoder/decoder or signaled from the encoder to the decoder.

In addition, up to V of the neighboring blocks each having a size of M×N or less among the neighboring blocks adjacent to the current block may be included in the candidate list of the current block.

In addition, up to V of the neighboring blocks each having a size of M×N or more and P×Q or less among the neighboring blocks adjacent to the current block may be included in the candidate list of the current block. At this time, P may mean the width of the block, Q may mean the height of the block, and P and Q may be positive integers.

In addition, if at least one of the width or height of the neighboring block is greater than at least one of M or N, the neighboring block may be included in the candidate list.

In addition, up to V of the neighboring blocks each having an area of M×N or more among the neighboring blocks adjacent to the current block may be included in may be included in the candidate list of the current block.

In addition, up to V of the neighboring blocks each having an area of M×N or less among the neighboring blocks adjacent to the current block may be included in the candidate list of the current block.

In addition, up to V of the neighboring blocks each having an area of M×N or more and P×Q or less among the neighboring blocks adjacent to the current block may be included in the candidate list of the current block.

The neighboring block may be included in the candidate list in order from a neighboring block, which is adjacent to the current block, having a large size to a neighboring block having a small size.

Alternatively, the neighboring block may be included in the candidate list in order from a neighboring block, which is adjacent to the current block, having a small size to a neighboring block having a large size.

In addition, if the size of the neighboring block adjacent to the current block is greater than or equal to that of the current block, the neighboring block may be included in the candidate list.

Alternatively, if the size of the neighboring block adjacent to the current block is less than or equal to that of the current block, the neighboring block may be included in the candidate list.

Referring to FIG. 12, gray blocks shown in FIG. 12 have sizes greater than or equal to M×N and thus may mean neighboring blocks which may be included in the candidate list.

For example, if the size of the neighboring block is 16×8 or 8×16, the neighboring block may be included in the candidate list. That is, the candidate list of the current block X may be constructed to include at least one of blocks {A, C, P, Q, S}.

Referring to FIG. 13, gray blocks shown in FIG. 13 have sizes greater than or equal to M×N and thus may mean neighboring blocks which may be included in the candidate list.

For example, if the area of the neighboring block is 16×8 (=128) or 8×16 (=128), the neighboring block may be included in the candidate list. That is, the candidate list of the current block X may be constructed to include at least one of blocks {A, C, F, P, Q, R, S}.

Figure 14:
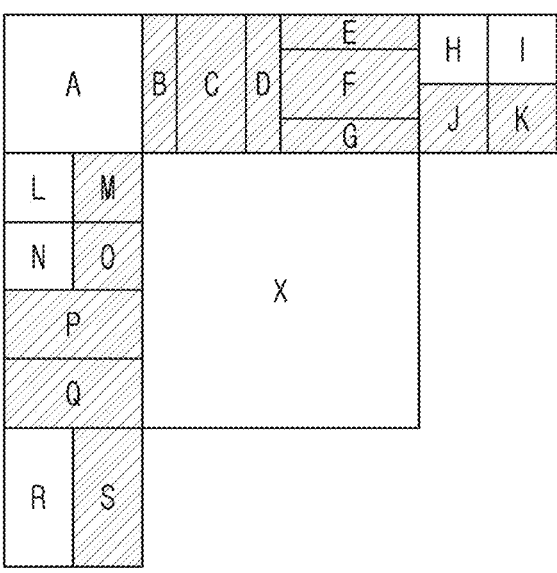
FIGS. 14 and 15 are views illustrating a method of adding a neighboring block to a candidate list in consideration of the depth of the neighboring block, according to an embodiment of the present invention.
Figure 15:
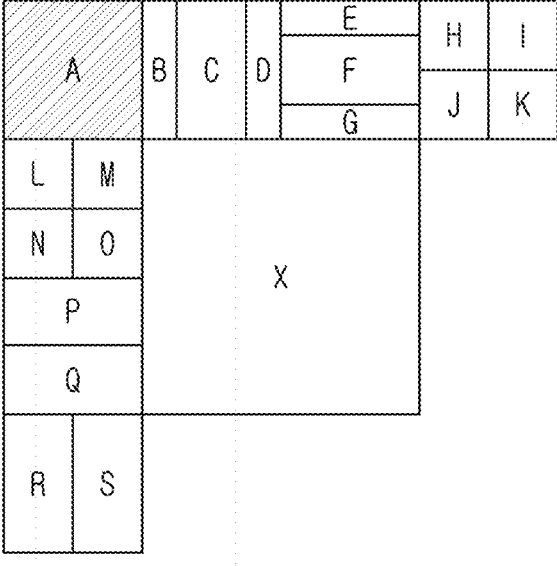

FIGS. 14 and 15 are views illustrating a method of adding a neighboring block to a candidate list in consideration of the depth of the neighboring block, according to an embodiment of the present invention.

According to the depths of the neighboring blocks adjacent to the current block, up to V of the neighboring block may be included in the candidate list of the current block.

For example, up to V of the neighboring blocks each having a depth of K or more among the neighboring blocks adjacent to the current block may be included in the candidate list of the current block.

At this time, K may be a positive integer including 0. In addition, K may be determined based on at least one of the coding parameter of the current block or the coding parameter of the candidate. In addition, K may be predetermined in the encoder/decoder or signaled from the encoder to the decoder.

In addition, up to V of the neighboring blocks each having a depth of K or less among the neighboring blocks adjacent to the current block may be included in the candidate list of the current block.

In addition, up to V of the neighboring blocks each having a depth of K or more and L or less among the neighboring blocks adjacent to the current block may be included in the candidate list of the current block. At this time, L may be a positive integer including 0.

The neighboring block may be included in the candidate list in order from a neighboring block, which is adjacent to the current block, having a large depth to a neighboring block, which is adjacent to the current block, having a small depth.

Alternatively, the neighboring block may be included in the candidate list in order from a neighboring block, which is adjacent to the current block, having a small depth to a neighboring block, which is adjacent to the current block, having a large depth.

In addition, if the depth of the neighboring block is greater than or equal to that of the current block, the neighboring block may be included in the candidate list.

In addition, if the depth of the neighboring block is less than or equal to that of the current block, the neighboring block may be included in the candidate list.

Referring to FIG. 14, gray blocks shown in FIG. 14 have depths greater than or equal to K and thus may mean neighboring blocks which may be included in the candidate list.

For example, the current block X may have a depth of 1, a block A may have a depth of 2, and blocks B, C, D, E, F, G, H, I, J, K, L, M, N, O, P, Q, R and S may have a depth of 3. The examples of such block depths may be commonly used in the following drawings.

At this time, for example, if the depth of the neighboring block is greater than or equal to 3, the neighboring block may be included in the candidate list. That is, the candidate list of the current block X may be constructed to include at least one of blocks {B, C, D, E, F, G, J, K, M, O, P, Q, S}.

Referring to FIG. 15, gray blocks shown in FIG. 15 have depths less than or equal to K and thus may mean neighboring blocks which may be included in the candidate list.

For example, if the depth of the neighboring block is less than or equal to 2, the neighboring block may be included in the candidate list. That is, the candidate list of the current block X may be constructed to include a block {A}.

Figure 16:
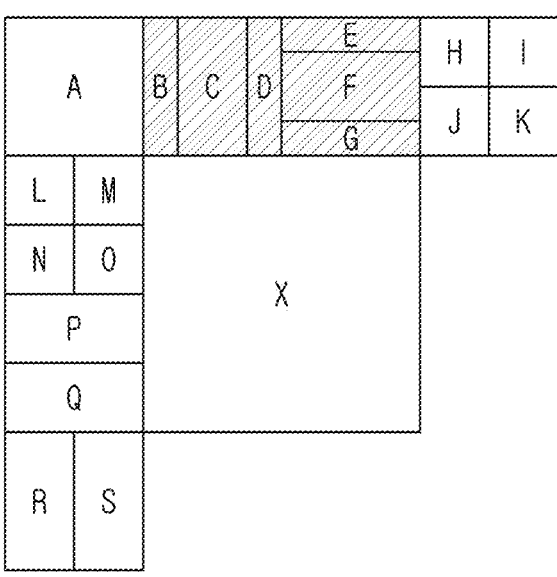
FIGS. 16 and 17 are views illustrating a method of adding a neighboring block to a candidate list in consideration of the partitioning form of the neighboring block, according to an embodiment of the present invention.
Figure 17:
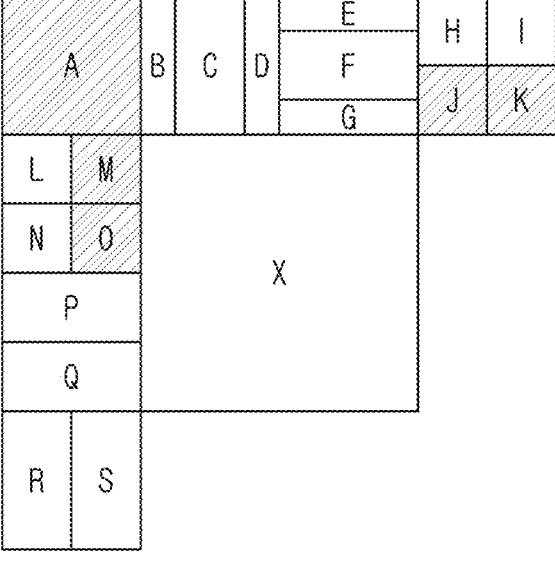

FIGS. 16 and 17 are views illustrating a method of adding a neighboring block to a candidate list in consideration of the partitioning form of the neighboring block, according to an embodiment of the present invention.

According to the partitioning forms of the neighboring blocks adjacent to the current block, up to V of the neighboring blocks may be included in the candidate list of the current block.

Whether any one of the partitioning forms of the neighboring blocks is included in the candidate list may be determined at least one of the coding parameter the current block or the neighboring block or the coding parameter of the candidate. In addition, this may be determined according to a method predetermined in the encoder and the decoder or may be determined by a value signaled from the encoder to the decoder.

For example, at least one of blocks partitioned into quadtrees among the neighboring blocks adjacent to the current block may be included in the candidate list.

In addition, at least one of blocks partitioned into binary trees among the neighboring blocks adjacent to the current block may be included in the candidate list.

In addition, at least one of blocks partitioned into ternary trees among the neighboring blocks adjacent to the current block may be included in the candidate list.

At this time, the binary-tree partitioning may include not only symmetric binary trees in which binary-tree nodes have the same size but also asymmetric trees in which binary-tree nodes have different sizes.

In addition, the ternary-tree partitioning may include not only symmetric ternary trees in which, as ternary-tree nodes, upper and lower blocks and left and right blocks with a middle block interposed therebetween have the same size but also asymmetric ternary trees in which, as ternary-tree nodes, upper and lower blocks or left and right blocks with a middle block interposed therebetween have different sizes.

The neighboring block may be included in the candidate list in order of a neighboring block, which is adjacent to the current block, partitioned into quad trees, a neighboring block partitioned into binary trees, and a neighboring block partitioned into ternary trees.

Alternatively, the neighboring block may be included in the candidate list in order of a neighboring block, which is adjacent to the current block, partitioned into ternary trees, a neighboring block partitioned into binary trees, and a neighboring block partitioned into quad trees.

In addition, if the partitioning form of the neighboring block is equal to that of the current block, the neighboring block may be included in the candidate list.

In addition, if the partitioning form of the neighboring block is different from that of the current block, the neighboring block may be included in the candidate list.

Referring to FIG. 16, gray blocks shown in FIG. 16 are neighboring blocks partitioned into binary trees and thus the neighboring block may be included in the candidate list.

For example, blocks X, A, H, I, J, K, L, M, N and O may have a quad-tree partitioning form, blocks B, C, D, E, F and G may have a ternary-tree partitioning form, and blocks P, Q, R and S may have a binary-tree partitioning form. The examples of such block partitioning forms may be commonly used in the following drawings.

At this time, for example, if the partitioning form of the neighboring block is a ternary-tree partitioning form, the neighboring block may be included in the candidate list. That is, the candidate list of the current block X may be constructed to include at least one of blocks {B, C, D, E, F, G}.

Referring to FIG. 17, gray blocks shown in FIG. 17 are neighboring blocks having the same partitioning form as the current block and thus the neighboring block may be included in the candidate list.

For example, if the partitioning form of the current block X is a quad-tree partitioning form, the neighboring block may be included in the candidate list. That is, the candidate list of the current block X may be constructed to include at least one of blocks {A, J, K, M, O}.

Figure 18:
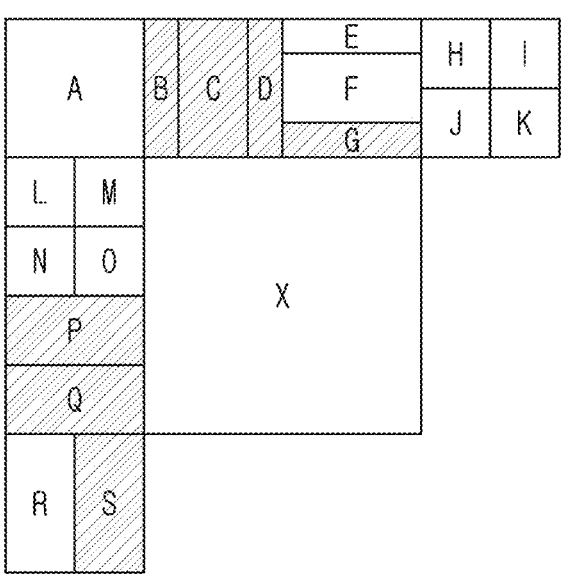
FIGS. 18 and 19 are views illustrating a method of adding a neighboring block to a candidate list in consideration of the block form of the neighboring block, according to an embodiment of the present invention.
Figure 19:
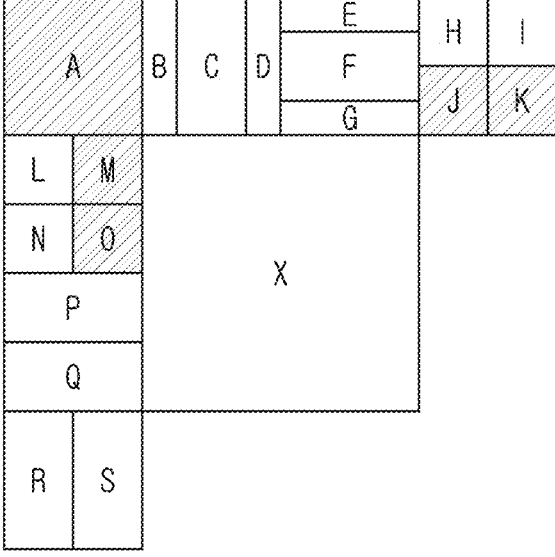

FIGS. 18 and 19 are views illustrating a method of adding a neighboring block to a candidate list in consideration of the block form of the neighboring block, according to an embodiment of the present invention.

According to the block forms of the neighboring blocks adjacent to the current block, up to V of the neighboring blocks may be included in the candidate list of the current block.

For example, at least one of blocks having a square form among the neighboring blocks adjacent to the current block may be included in the candidate list.

In addition, at least one of blocks having a non-square (rectangular) form among the neighboring blocks adjacent to the current block may be included in the candidate list.

In addition, the neighboring block may be included in the candidate list in order of a neighboring block, which is adjacent to the current block, having a square form and a neighboring block having a rectangular form.

Alternatively, the neighboring block may be included in the candidate list in order of a neighboring block, which is adjacent to the current block, having a rectangular form and a neighboring block having a square form.

In addition, if the block form of the neighboring block is equal to that of the current block, the neighboring block may be included in the candidate list.

Alternatively, if the block form of the neighboring block is different from that of the current block, the neighboring block may be included in the candidate list.

Referring to FIG. 18, gray blocks shown in FIG. 18 are neighboring blocks having the same form as the current block and thus the neighboring blocks may be included in the candidate list.

For example, if the block form of the neighboring block is a rectangular form, the neighboring block may be included in the candidate list. That is, the candidate list of the current block X may be constructed to include at least one of blocks {B, C, D, G, P, Q, S}.

Referring to FIG. 19, gray blocks shown in FIG. 19 are neighboring blocks having the same block form as the current block and thus the neighboring blocks may be included in the candidate list.

For example, if the block form of the neighboring block is a square form, the neighboring block may be included in the candidate list. That is, the candidate list of the current block X may be constructed to include at least one of blocks {A, J, K, M, O}.

According to an embodiment of the present invention, if at least one of the boundary or vertex of the current block adjoins at least one of the boundary or vertex of the neighboring block, the neighboring block may be included in the candidate list, using the relative length of the boundaries of the neighboring blocks having adjoining boundaries or vertexes, the relative sizes of the neighboring blocks or the relative depths of the neighboring blocks.

For example, according to the relative lengths of the neighboring blocks having adjoining boundaries, the relative sizes of the neighboring blocks, or the relative depths of the neighboring blocks, up to V of the neighboring blocks may be included in the candidate list of the current block.

At this time, if there are a neighboring block having a boundary length of M and a neighboring block having an adjoining boundary length of N, a specific neighboring block may be included in the candidate list, by comparing N with M.

For example, if there are a neighboring block having a boundary length of 8 and a neighboring block having an adjoining boundary length of 4, only the neighboring block having the larger boundary length, that is, the neighboring block having the boundary length of 8, may be included in the candidate list.

As another example, if there are a neighboring block having a boundary length of 4 and a neighboring block having an adjoining boundary length of 16, only the neighboring block having the smaller boundary length, that is, the neighboring block having the boundary length of 4, may be included in the candidate list.

In addition, if there are a neighboring block having a block size of M×N and a neighboring block having a block size of P×Q, a specific neighboring block may be included in the candidate list, by comparing the sizes of the neighboring blocks. At this time, M and N, and P and Q may be the same positive integers or different positive integers.

For example, if there are a neighboring block having a block size of 8×8 and a neighboring block having a block size of 16×16, the neighboring block having the larger block size, that is, the neighboring block having the block size of 16×16, may be included in the candidate list.

In addition, if there are a neighboring block having a block depth of N and a neighboring block having a block depth of M, a specific neighboring block may be included in the candidate list, by comparing N with M.

For example, if a neighboring block having a block depth of 0 and a neighboring block having a block depth of 2, the neighboring block having the smaller block depth, that is, the neighboring block having the block depth of 0, may be included in the candidate list.

Figure 20:
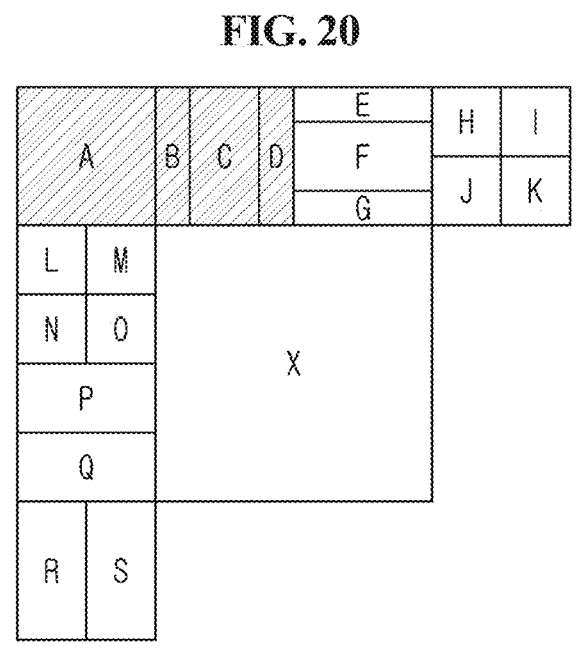

FIG. 20 is a view illustrating a method of adding a neighboring block to a candidate list in consideration of the encoding/decoding order of the neighboring block, according to an embodiment of the present invention.

According to the encoding/decoding order of the neighboring blocks adjacent to the current block, up to V of the neighboring blocks may be included in the candidate list of the current block.

At this time, the encoding/decoding order may be at least one of a horizontal priority order, a vertical priority order, a Z-shaped order, a zigzag order, an upper right diagonal order, a lower left diagonal order, a raster order, a depth priority order or a size priority order.

Referring to FIG. 20, gray blocks shown in FIG. 20 indicate neighboring blocks which may be included in the candidate list according to the encoding/decoding orders of the neighboring block.

For example, if the encoding/decoding order of the neighboring blocks are A, B, C, D, E, F, G, H, I, J, K, L, M, N, O, P, Q, R and S, up to Z neighboring blocks in order may be included in the candidate list. That is, the example of FIG.

20 shows the case of Z=4. At this time, the candidate list of the current block X may be constructed to include at least one of blocks {A, B, C, D}.

Figure 21:
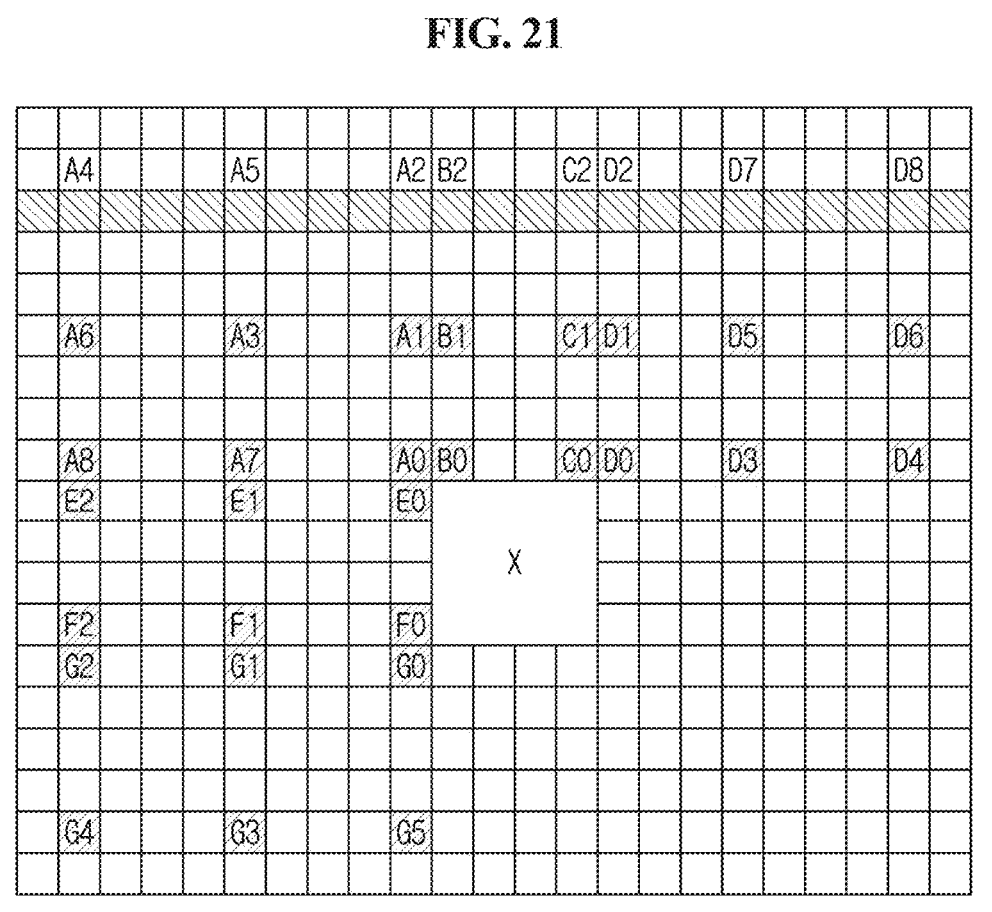

FIG. 21 is a view illustrating a method of adding a neighboring block to a candidate list in consideration of the position of the neighboring block located at a specific distance from the position of a current block, according to an embodiment of the present invention.

Up to V of the neighboring blocks located at a specific distance from the position of the current block may be included in the candidate list of the current block. That is, even if there is a plurality of blocks between the current block and the neighboring block, according to a specific condition, up to V of the neighboring blocks may be included in the candidate list of the current block.

At this time, the value V may be determined based on at least one of the coding parameter of the current block and the coding parameter of the candidate. In addition, V may be predetermined in the encoder and the decoder or may be signaled from the encoder to the decoder.

A block located at a distance of −K×M or +K×M in a horizontal direction or a distance of −L×N or +L×N in a vertical direction from the specific position of the current block may be determined as a neighboring block, and the neighboring block may be included in the candidate list. That is, a block located at a distance obtained by adding at least one of a sample position of −K×M or +K×M in a horizontal direction and a sample position of −L×N or +L×N in a vertical direction to at least of specific positions of the current block may be determined as a neighboring block and the neighboring block may be included in the candidate list.

In addition, at least one of blocks included in a specific region based on the current block among the neighboring blocks located at the above-described positions may be included in the candidate list of the current block. At this time, the specific region may be predetermined in the encoder/decoder or may be signaled from the encoder to the decoder.

That is, M and N may mean relative distances from the specific position of the current block. Here, the specific position in the current block may be at least one of (0, 0) position, (width−1, 0) position, (width, 0) position, (0, height−1) position, (0, height) position, (−1, −1) position, (−1, 0) position, (0, −1) position, (width−1, −1) position, (width, −1) position, (−1, height−1) position, (−1, height) position, (width/2−1, 0) position, (width/2, 0) position, (width/2+1, 0) position, (0, height/2−1) position, (0, height/2) position, (0, height/2+1) position, (width/2−1, −1) position, (width/2, −1) position, (width/2+1, −1) position, (−1, height/2−1) position, (−1, height/2) position or (−1, height/2+1) position with respect to the block.

Here, M may mean a horizontal distance in sample units and N may mean a vertical distance in sample units. M and N may be positive integers. In addition, M and N may be the same value or different values. In addition, at least one of M or N may be determined based on at least one of the coding parameter of the current block or the coding parameter of the candidate. In addition, at least one of M or N may be predetermined in the encoder/decoder or signaled from the encoder to the decoder.

Here, the absolute value of M and the absolute value of N may have values of a maximum of Ma×M and a maximum of Ma×N, respectively. In addition, the absolute value of M and the absolute value of N may be determined to be less than equal to K or L times the size of a CTU.

Here, at least one of Ma×M or Ma×N may be a positive integer. In addition, at least one of Ma×M or Ma×N may be determined based on at least one of the coding parameter of the current block or the coding parameter of the candidate. In addition, at least one of MaxM or MaxN may be predetermined in the encoder/decoder or signaled from the encoder to the decoder.

Here, at least one of K or L may be a positive integer including 0. In addition, at least one of K or L may be determined based on at least one of the coding parameter of the current block or the coding parameter of the candidate. In addition, at least one of K or L may be predetermined in the encoder/decoder or signaled from the encoder to the decoder.

If a block located at least one of a distance of −KxM or +KxM in the horizontal direction or a distance of −LxN or +LxN in the vertical direction is located at a boundary of at least one of a picture, a subpicture, a slice, a tile, a brick, a CTU boundary, a CTU row or a CTU column or crosses at least one of a picture, a subpicture, a slice, a tile, a brick, a CTU boundary, a CTU row or a CTU, the neighboring block at the corresponding position may not be included in the candidate list.

In addition, if at least one of the neighboring blocks immediately adjacent to the current block is not present, at least one of the neighboring blocks located at a specific distance from the position of the current block may be included in the candidate list.

In addition, when the neighboring block located at the specific distance from the position of the current block is included in the candidate list, neighboring blocks located in a specific scan order may be included in the candidate list. At this time, the specific scan order may be at least one of a horizontal priority order, a vertical priority order, a Z-shaped order, a zigzag order, an upper right diagonal order, a lower left diagonal order, a raster order, a depth priority order or a size priority order. In addition, at least one of the neighboring blocks may be included in the candidate list in order in which a distance between the current block and the block located at a specific distance therefrom is small.

Referring to FIG. 21, gray blocks shown in FIG. 21 may mean neighboring blocks which are located at a specific distance from the position of the current block and may be included in the candidate list.

In addition, parts indicated by a diagonal line in FIG. 21 may mean at least one of a picture, a subpicture, a slice, a tile, a brick, a CTU boundary, a CTU row or a CTU column.

As in the example of FIG. 21, when the current block X has a size of 16×16 and M and N are 16, at least one of neighboring blocks which do not cross at least one of a picture, a subpicture, a slice, a tile, a brick, a CTU boundary, a CTU row or a CTU column may be included in the candidate list. That is, the candidate list of the current block X may be constructed to include at least one of blocks {A0, A1, A3, A6, A7, A8, B0, B1, C0, C1, D0, D1, D2, D3, D4, D5, D6, E0, E1, E2, F0, F1, F2, G0, G1, G2, G3, G4, G5}. Accordingly, at least one of the neighboring blocks located at relative positions from the position of the current block may be included in the candidate list of the current block.

In order to reduce the size of a line buffer, if a block located at at least one of a distance of −KxM or +KxM in the horizontal direction or a distance of −LxN or +LxN in the vertical direction is located at the boundary of at least one of a picture, a subpicture, a slice, a tile, a brick, a CTU row or a CTU column or crosses at least one of a picture, a subpicture, a slice, a tile, a brick, a CTU boundary, a CTU row or a CTU, the block crossing at least one of the picture, the subpicture, the slice, the tile, the brick, the CTU boundary, the CTU row or the CTU column may not be included in the candidate list and the block located at the boundary of at least one of the picture, the subpicture, the slice, the tile, the brick, the CTU boundary, the CTU row or the CTU column may be included in the candidate list.

In addition, information on a block located at a specific position in the neighboring block located at a specific distance from the position of the current block may be determined as information on a representative block of the neighboring block, and the corresponding block may be included in the candidate list.

For example, the specific position may be at least one of a top left position, a bottom left position, a top right position, a bottom right position, a middle position, a top left position adjacent to the middle position, a bottom left position adjacent to the middle position, a top right position adjacent to the middle position or a bottom right position adjacent to the middle position.

The specific block being located at the boundary of at least one of the picture, the subpicture, the slice, the tile, the brick, the CTU boundary, the CTU row or the CTU column may mean that the specific block belongs to a picture, a subpicture, a slice, a tile, a brick, a CTU boundary, a CTU row or a CTU column other than a picture, a subpicture, a slice, a tile, a brick, a CTU boundary, a CTU row or a CTU column, to which the current block belongs, and is located at the boundary of at least one of the picture, the subpicture, the slice, the tile, the brick, the CTU boundary, the CTU row or the CTU column. That is, this may mean that the specific block is located within at least one of the picture, subpicture, the slice, the tile, the brick, the CTU boundary, the CTU row or the CTU column at upper and/or left sides of the current block.

The specific block crossing the boundary of at least one of the picture, the subpicture, the slice, the tile, the brick, the CTU boundary, the CTU row or the CTU column may mean that the specific block belongs to a picture, a subpicture, a slice, a tile, a brick, a CTU boundary, a CTU row or a CTU column other than a picture, a subpicture, a slice, a tile, a brick, a CTU boundary, a CTU row or a CTU column, to which the current block belongs, and is located at at least one of the picture, the subpicture, the slice, the tile, the brick, the CTU boundary, the CTU row or the CTU column. That is, this may mean that the specific block is located within at least one of the left picture, the subpicture, the slice, the tile, the brick, the CTU boundary, the CTU row or the CTU column at the upper and/or left sides of the current block.

Figure 22:
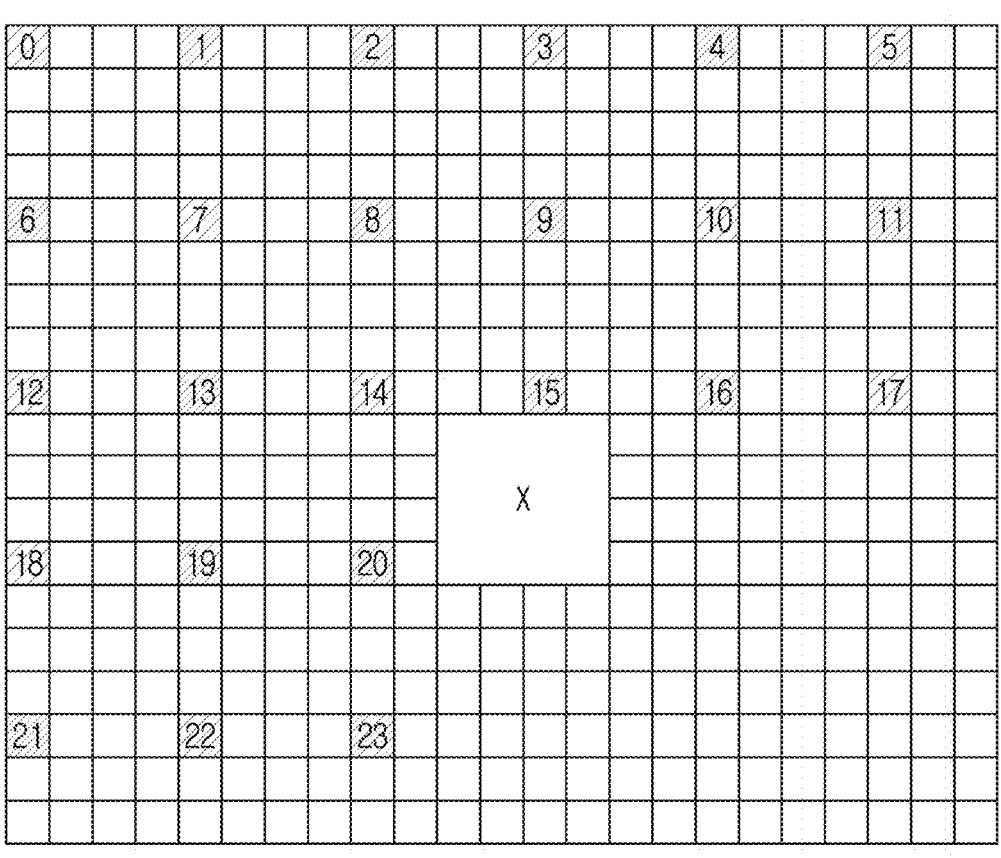
FIG. 22 is a view illustrating a method of adding a neighboring block to a candidate list in consideration of the position of the neighboring block located at a specific distance from the position of at least one of a current picture, subpicture, slice, tile, brick, CTU boundary, CTU row or CTU column, according to an embodiment of the present invention.

FIG. 22 is a view illustrating a method of adding a neighboring block to a candidate list in consideration of the position of the neighboring block located at a specific distance from the position of at least one of a current picture, subpicture, slice, tile, brick, CTU boundary, CTU row or CTU column, according to an embodiment of the present invention.

Up to V of the neighboring blocks located at a specific distance from the position of at least one of the current picture, subpicture, slice, tile, brick, CTU boundary, CTU row or CTU column may be included in the candidate list of the current block. That is, even if there is a plurality of blocks between the current block and the neighboring block, up to V of the neighboring block may be included in the candidate list of the current block.

Blocks located at at least one of a distance of KxM in the horizontal direction and a distance of LxN in the vertical direction from the specific position of at least one of the current picture, subpicture, slice, tile, brick, CTU boundary, CTU row or CTU column may be determined as the neighboring blocks of the current block and may be included in the candidate list.

That is, blocks located at positions obtained by adding at least one of the distance of K×M in the horizontal direction and the distance of L×N in the vertical direction to at least one of the current picture, subpicture, slice, tile, brick, CTU boundary, CTU row or CTU column may be determined as neighboring blocks and may be included in the candidate list.

In addition, at least one of the neighboring blocks included in a specific region based on the current block among the neighboring blocks located at the above-described positions may be included in the candidate list. At this time, the specific region may be predetermined in the encoder/decoder or signaled from the encoder to the decoder.

That is, M and N may mean absolute distances from the specific position of at least one of the current picture, subpicture, slice, tile, brick, CTU boundary, CTU row or CTU column. Here, the specific position of at least one of the current picture, subpicture, slice, tile, brick, CTU boundary, CTU row or CTU column may be defined as (0, 0) position based on at least one of the current picture, subpicture, slice, tile, brick, CTU boundary, CTU row or CTU column.

Here, M may mean a distance in a horizontal direction in sample units, N may mean a distance in a vertical direction in sample units, M and N may be positive integers which are square numbers of 2, such as 2, 4, 8, 16 and 32. For example, M and N may be the same value or different values. In addition, at least one of M or N may be determined based on at least one of the coding parameter of the current block or the coding parameter of the candidate. In addition, at least one of M or N may be predetermined in the encoder/decoder or signaled from the encoder to the decoder.

Here, at least one of K or L may be a positive integer including 0. In addition, at least one of K or L may be determined based on at least one of the coding parameter of the current block or the coding parameter of the candidate. In addition, at least one of K or L may be predetermined in the encoder/decoder or signaled from the encoder to the decoder.

In addition, if at least one of the neighboring blocks immediately adjacent to the current block is not present, the neighboring blocks located at the specific distance from the specific position of at least one of the current picture, subpicture, slice, tile, brick, CTU boundary, CTU row or CTU column may be included in the candidate list.

In addition, when the neighboring blocks located at the specific distance from the specific position of at least one of the current picture, subpicture, slice, tile, brick, CTU boundary, CTU row or CTU column are included in the candidate list, the neighboring blocks located in specific scan order may be included in the candidate list. At this time, the specific scan order may be at least one of a horizontal priority order, a vertical priority order, a Z-shaped order, a zigzag order, an upper right diagonal order, a lower left diagonal order, a raster order, a depth priority order or a size priority order. In addition, at least one of the neighboring blocks may be included in the candidate list in order in which a distance between the current block and the neighboring block is small.

Referring to FIG. 22, gray blocks shown in FIG. 22 may mean neighboring blocks which are located at a specific distance from the position of the current picture and may be included in the candidate list.

As in the example of FIG. 22, when the specific position of the current picture is (0, 0) position, the current block X has a size of 16×16, K and L are positive integers including 0 and M and N are 16, neighboring blocks corresponding to (K×M, L×N) position from the (0, 0) position of the current position may be included in the candidate list and the candidate list of the current block X may be constructed to include at least one of blocks {0, 1, 2, 3, 4, 5, 6, 7, 8, 9, 10, 11, 12, 13, 14, 15, 16, 17, 18, 19, 20, 21, 22, 23}. At this time, the value K of an x coordinate and the value L of a y coordinate in (K×M, L×N) may have the same value or different values.

Accordingly, at least one of the neighboring blocks located at the absolute position from the current picture, subpicture, slice, tile, brick, CTU boundary, CTU row or CTU column may be included in the candidate list of the current block.

According to an embodiment of the present invention, up to V of the neighboring blocks may be included in the candidate list of the current block according to a coding parameter relation between the current block and neighboring blocks adjacent thereto.

For example, if at least one of the coding parameters of the current block and at least one of the coding parameters of the neighboring block are the same, up to V of the neighboring blocks may be included in the candidate list of the current block.

For example, if a prediction mode is the same, if an intra luma prediction mode/direction is the same, if an intra chroma prediction mode/direction is the same, if a motion vector is the same, if a motion vector difference is the same, if a reference image list is the same, if a reference image index is the same, if a reference image is the same, if inter prediction direction (an inter prediction indicator or a prediction list utilization flag) is the same, if use of a merge mode is the same, if use of a skip mode is the same, if a motion vector prediction index is the same, if a merge index is the same, if motion vector representation accuracy is the same, if a transform type is the same, if a transform size is the same, if use of primary transform is the same, if use of secondary transform is the same, if a primary transform index is the same, of a secondary transform index is the same, if residual signal presence/absence information is the same, if a coding block pattern is the same, or if a quantization parameter is the same, the neighboring block may be included in the candidate list.

As another example, if at least one of the coding parameters of the current block and at least one of the coding parameters of the neighboring blocks are similar, up to V of the neighboring blocks may be included in the candidate list of the current block.

For example, if a difference between the intra luma prediction mode/direction and the intra luma prediction mode/direction of the neighboring block is equal to or less than a value T or if a difference between the motion vector of the current block and the motion vector of the neighboring block is equal to or less than the value T, if a difference between the motion vector difference of the current block and the motion vector difference of the neighboring block is equal to or less than the value T, or if a difference between the reference image index of the current block and the reference image index of the neighboring block is equal to or less than the value T, the neighboring block may be included in the candidate list. Here, T may mean a real number.

For example, if reference image lists are different but reference images are the same or if reference image indices are different but reference images are the same, the neighboring block may be included in the candidate list.

According to an embodiment of the present invention, the encoder/decoder may entropy-code/decode the coding parameter identifiers of neighboring blocks to be included in a candidate lit and include neighboring blocks in the candidate list based on similarity between the coding parameters.

For example, the encoder may entropy-code the coding parameter identifier of the neighboring block to be included in the candidate list and include a neighboring block having the same value as the coding parameter, a neighboring block having a larger value than the coding parameter or a neighboring block having a smaller value than the coding parameter in the candidate list.

In addition, the decoder may entropy-decode the coding parameter identifier of the neighboring block to be included in the candidate list and include a neighboring block having the same value as the coding parameter, a neighboring block having a larger value than the coding parameter or a neighboring block having a smaller value than the coding parameter in the candidate list.

According to an embodiment of the present invention, a block in a reference image having the same spatial position as (co-located on) the current block may be included in the candidate list of the current block as a neighboring bock. At this time, a block temporally adjacent to the current block may mean a block in a reference image co-located on the current block or a block in a reference image having a spatial position corresponding to that of the current block.

For example, at least one of the neighboring blocks belonging to a reference image for the current image among the images other than the image belonging to the current block may be included in the candidate list. At least one of the neighboring blocks belonging to the reference image may be referred to as a temporally adjacent neighboring block.

At this time, the neighboring block may mean a block having the same spatial position as (co-located on) the current block among the blocks in the reference image or a block adjacent to a block having the same spatial position as the current block among the blocks in the reference image.

According to an embodiment of the present invention, the reference block for the current block may be determined from the candidate list.

Before a reference block to be used for encoding/decoding of the current block among the neighboring blocks included in the candidate list, at least one of the following methods or at least one combination thereof may be used to change the candidate list. If at least one combination of the following methods is used, the following methods may be performed in specific order to change the candidate list.

Hereinafter, a neighboring block included in the candidate list may be referred to as a candidate and the block information of the neighboring block included in the candidate list may be referred to as a candidate. In addition, a block included in the candidate list may be referred to a candidate and the block information of the block included in the candidate list may be referred to as a candidate.

The candidates in the candidate list may be sorted in a predetermined order. At this time, sorting in the predetermined order may be determined based on at least one of the coding parameter of the current block or the coding parameter of the candidate.

For example, sorting in the predetermined order may be determined in order in which at least one of the coding parameter of the current block or the coding parameter of the candidate increases. In addition, sorting in the predetermined order may be determined in order in which at least one of the coding parameter of the current block or the coding parameter of the candidate decreases.

The encoder may sort the candidates in the candidate list in order in which a probability that a candidate in the candidate list is determined as a reference block is high, and allocate a candidate index having a short codeword length to a candidate having a high probability of being determined as a reference block.

The encoder/decoder may limit the size of the candidate list to up to U. Here, U may be a positive integer including 0. In addition, U may be determined based on at least one of the coding parameter of the current block or the coding parameter of the candidate. In addition, U may be predetermined in the encoder/decoder or signaled from the encoder to the decoder.

For example, if there are more than U candidates in the candidate list, candidates other than U candidates may be excluded from the candidate list. At this time, the excluded candidates may be determined by a sorting method in the candidate list.

The encoder/decoder may remove up to U candidates in the candidate list from the candidate list. Here, U may be a positive integer including 0. In addition, U may be determined based on at least one of the coding parameter of the current block or the coding parameter of the candidate. In addition, U may be predetermined in the encoder/decoder or signaled from the encoder to the decoder.

If there are at least two candidates overlapping each other in the candidate list, at least one of the candidates overlapping each other may be removed from the candidate list. At this time, among the candidates overlapping each other, a candidate having a higher order in the candidate list may be left in the candidate list and a candidate having a lower order may be removed from the candidate list. Here, if at least one of the coding parameters of the candidates overlaps, these may be candidates overlapping each other.

For example, whether the candidates in the candidate list are removed may be determined using an inverse of a method of using at least one of the embodiments in which the neighboring block is included in the candidate list or at least one combination thereof.

The encoder/decoder may add up to U candidates to the candidate list. Here, U may be a positive integer including 0. In addition, U may be determined based on at least one of the coding parameter of the current block or the coding parameter of the candidate. In addition, U may be predetermined in the encoder/decoder or signaled from the encoder to the decoder.

Candidates may be added to the list until reaching a maximum number of candidates in the candidate list. At this time, candidates overlapping each other may be added.

When the encoder/decoder adds candidates to the candidate list, at least one of the embodiments in which the neighboring block is included in the candidate list or at least one combination thereof may be used.

In addition, if a candidate to be added to the candidate list overlaps a candidate in the candidate list, the candidate to be added may not be added to the candidate list.

The encoder/decoder may determine up to W of the neighboring blocks (candidates) included in the candidate list as the reference block for the current block. In addition, the encoder or the decoder may determine up to W of the block information (candidates) of the neighboring blocks included in the candidate list as information on the reference block for the current block.

Here, W may be a positive integer including 0. In addition, W may be determined based on at least one of the coding parameter of the current block or the coding parameter of the candidate. In addition, W may be predetermined in the encoder/decoder or signaled from the encoder to the decoder.

For example, if the current block is predicted by being partitioned into subblocks, the encoder/decoder may determine W of the candidates in the candidate list as information on the reference block for the current block, in order to code/decode the current block. For example, W may be 2.

At this time, a prediction mode in which prediction is performed by partitioning the current block into two subblocks may be referred to as a geometric partitioning mode (GPM).

If the size of the current block is equal to or greater than M×N, the current block may be coded/decoded by the GPM. In addition, the GPM may be an example of a merge mode. That is, in the above-described example, the candidate list used to perform encoding/decoding may mean a merge candidate list. Whether the current block is coded/decoded by the GPM may be signaled at a coding unit level. Here, M and N may be positive integers. In addition, M and N may be the same value or different values, and, for example, M and N may be 8.

If the current block is coded/decoded by the GPM, the current block may be partitioned into two subblocks. At this time, information on a partitioning direction for partitioning the current block into two subblocks may be coded/decoded. In order to code/decode the two partitioned subblocks, a neighboring block for encoding/decoding each region may be selected from the candidate list.

In order to derive the motion information of each subblock, an index for each subblock may be coded/decoded. For example, if the current block is partitioned into a first region and a second region, a first index for encoding/decoding of the first region and a second index for encoding/decoding of the second region may be coded/decoded. Here, when two pieces of information are determined as information on the reference block for the current block, information indicated by the first index may be information on a first reference block for the current block, and information indicated by the second index may be information on a second reference block for the current block.

The encoder/decoder may select a first neighboring block and a second neighboring block from the candidate list for the current block using the first index and the second index. At this time, the first region and the second region may share one candidate list derived based on the current block before partitioning. The encoder or the decoder may code/decode the first region using information on the selected first neighboring block and code/decode the second region using information on the selected second neighboring block.

If the current block is coded/decoded by the GPM, the first neighboring block and the second neighboring block may be determined from a single candidate list through the first index and the second index for the current block. The encoder/decoder may derive a first prediction block for the current block using information on the first neighboring block and derive a second prediction block for the current block using information on the second neighboring block.

The encoder/decoder may generate a final prediction block for the current block by weighted-summing the first prediction block and the second prediction block. At this time, the weighted-summing of the prediction blocks may be performed by giving a weight to the first region with respect to the first prediction block and giving a weight to the second region with respect to the second prediction block.

The first neighboring block may mean a first reference block for the current block, and the second neighboring block may mean a second reference block for the current block. In addition, information on the first neighboring block may mean information on the first reference block for the current block, and information on the second neighboring block may mean information on the second reference block for the current block.

The encoder/decoder may perform encoding/decoding of the current block using at least one of the determined reference blocks. In addition, the encoder or the decoder may perform encoding/decoding of the current block using at least one of block information of at least one of the determined reference blocks.

In addition, at least one of the determined block information of the reference blocks may be determined as at least one of the block information of the current block. In addition, at least one of the determined block information of the reference blocks may be determined as at least one of the block information of the current block.

Hereinafter, a method of, at a encoder/decoder, determining a specific neighboring block in a candidate list as a reference block will be described. The encoder or the decoder may determine the reference block in the candidate list using at least one of the following methods or at least one combination thereof.

For example, the encoder/decoder may determine a Y-th candidate in the candidate list as the reference block. Here, Y may be a positive integer including 0. In addition, Y may be determined based on at least one of the coding parameter of the current block or the coding parameter of the candidate. In addition, Y may be predetermined in the encoder/decoder or signaled from the encoder to the decoder.

At this time, since the Y-th candidate in the candidate list may be identified in the encoder/decoder, a candidate index for determining the reference block may not be entropy-coded/decoded. The embodiment related to sorting in the candidate list may be used to determine the order of the candidates in the candidate list for the Y-th candidate.

According to an embodiment of the present invention, the encoder/decoder may reduce or decrease the candidate list such that up to Y candidates remains in the candidate list, and determine Y candidates as the reference blocks. Here, Y may be a positive integer including 0. In addition, Y may be determined based on at least one of the coding parameter of the current block or the coding parameter of the candidate. In addition, Y may be predetermined in the encoder/decoder or signaled from the encoder to the decoder.

For example, the encoder/decoder may determine Y candidates as the reference blocks, by leaving only Y candidates having a highest probability of being selected as the reference block among the candidates in the candidate list.

At this time, since Y candidates in the candidate list may be identified in the encoder/decoder, a candidate index for determining the reference block may not be entropy-coded/decoded.

For example, the candidate list may be reduced or decreased using an inverse of the method of using at least one of the embodiments in which the neighboring block is included in the candidate list or at least one combination thereof.

As another example, the encoder or the decoder may determine the reference block by entropy-encoding/decoding a candidate index indicating a specific candidate in the candidate list. Here, the candidate index may be a value, to which the position, order, etc. of the candidate in the candidate list are mapped. The encoder or the decoder may code/decode the current block using the determined reference block (or at least one of the block information of the reference block).

That is, the encoder may code the current block using the determined reference block (or at least one of the block information of the reference block) among the candidates in the candidate list and entropy-code the candidate index for the reference block. Meanwhile, the decoder may entropy-decode the candidate index for the reference block and decode the current block using the candidate indicated by the candidate index among the candidates in the candidate list as the reference block (or at least one of the block information of the reference block).

For example, if the candidate list is composed of {A, B, C, D, E, F}, the indices of the candidates in the candidate list may be allocated {0, 1, 2, 3, 4, 5}. If the candidate index is 2, a candidate C may be determined as the reference block. In addition, if the candidate index is 1, a candidate B may be determined as the block information of the reference block.

The encoder/decoder may entropy-code/decode up to Y candidate indices. If a plurality of candidate indices is entropy-coded/decoded, the current block may be coded/decoded using a plurality of reference blocks indicated by a plurality of candidate indices.

Here, Y may be a positive integer including 0. In addition, Y may be determined based on at least one of the coding parameter of the current block or the coding parameter of the candidate. In addition, Y may be predetermined in the encoder/decoder or signaled from the encoder to the decoder.

That is, the encoder may code the current block using the determined Y reference blocks among the candidates in the candidate list and entropy-code the Y candidate indices for the Y reference blocks. Meanwhile, the decoder may entropy-decode the Y candidate indices for the Y reference blocks and decode the current block using the candidates indicated by the Y candidate indices among the candidates in the candidate list as the Y reference blocks.

The encoder/decoder may entropy-code/decode up to Y candidate indices. If a plurality of candidate indices is entropy-coded/decoded, the current block may be coded/decoded using a plurality of reference blocks indicated by the plurality of candidate indices.

Here, Y may be a positive integer including 0. In addition, Y may be determined based on at least one of the coding parameter of the current block or the coding parameter of the candidate. In addition, Y may be predetermined in the encoder/decoder or signaled from the encoder to the decoder.

That is, the encoder may code the current block using the determined Y reference blocks among the candidates in the candidate list and entropy-code the Y candidate indices for the Y reference blocks. Meanwhile, the decoder may entropy-decode the Y candidate indices for the Y reference blocks and decode the current block using the candidates indicated by the Y candidate indices among the candidates in the candidate list as the Y reference blocks.

The encoder/decoder may entropy-code/decode up to Y candidate indices. If a plurality of candidate indices is entropy-coded/decoded, the current block may be coded/decoded using a plurality of reference blocks indicated by the plurality of candidate indices.

Here, Y may be a positive integer including 0. In addition, Y may be determined based on at least one of the coding parameter of the current block or the coding parameter of the candidate. In addition, Y may be predetermined in the encoder/decoder or signaled from the encoder to the decoder.

That is, the encoder may code the current block using the determined Y reference blocks among the candidates in the candidate list and entropy-code the Y candidate indices for the Y reference blocks. Meanwhile, the decoder may entropy-decode the Y candidate indices for the Y reference blocks and decode the current block using the candidates indicated by the Y candidate indices among the candidates in the candidate list as the Y reference blocks.

Figure 23:
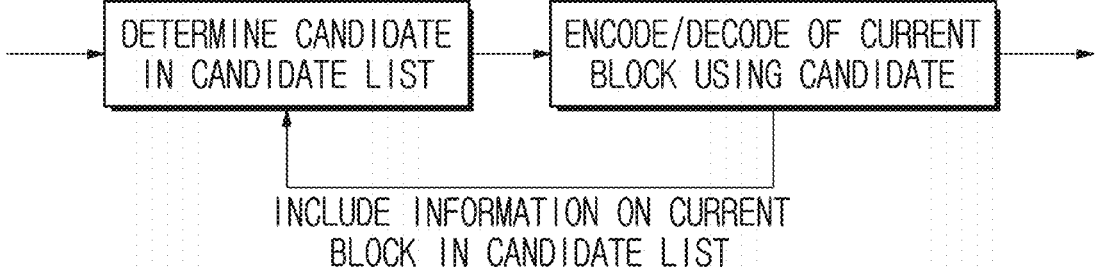
FIG. 23 is a view illustrating a process of adding block information of a current block to a candidate list, according to an embodiment of the present invention.

FIG. 23 is a view illustrating a method of adding block information of a current block to a candidate list, according to an embodiment of the present invention.

At least one of block information of a current block used in a coding or decoding process or generated after the coding or decoding process may be added to or included in a candidate list.

The information on the block may be at least one of coding parameters such as an intra prediction mode, a motion vector, motion information, an IBC motion vector, a weight value, an inter prediction direction, a reference image index, an inter prediction indicator or a prediction list utilization flag.

For example, if the current block is not an affine mode or if a subblock based temporal motion vector derivation mode is not used, at least one of the block information of the current block may be included in the candidate list.

As another example, if the current block is not an affine mode or is not a GPM mode or if a subblock based temporal motion vector derivation mode is not used, at least one of the block information of the current block may be included in the candidate list.

The candidate list according to the present invention may be maintained during encoding/decoding in units of pictures, subpictures, slices, tiles, bricks, CTU boundaries, CTU rows and CTU columns and may be used in units of pictures, subpictures, slices, tiles, bricks, CTU boundaries, CTU rows and CTU columns. In addition, the candidate list according to the present invention may include at least one of the block information of the previously coded/decoded block based on the current block in units of pictures, subpictures, slices, tiles, bricks, CTU boundaries, CTU rows and CTU columns. In addition, the candidate list according to the present invention may include at least one of the block information in the units coded/decoded previously. The candidate list including at least one of the block information of the previously encoded/decoded based on the current block may be referred to as a history-based candidate list. At this time, the history-based candidate list may include block vector information of the block encoded/decoded before encoding/decoding of the current block.

In the following description, the candidate list may mean the candidate list according to the present invention.

As shown in FIG. 23, at least one of the block information of the candidates in the candidate list may be determined or selected to be used for the encoding/decoding process of the current block. Therefore, the encoding/decoding process of the current block may be performed using at least one of the determined block information of the candidate.

At this time, at least one of the block information used for the encoding/decoding process of the current block or at least one of the block information of the current block generated after the encoding/decoding process of the current block may be added to or included in the candidate list. In the following description, adding at least one of block information, a candidate or a block to a candidate list and including at least one of block information, a candidate or a block in a candidate list may have the same meaning.

For example, when at least one of the block information of the current block is included in the candidate list, at least one of the block information of the current block may be firstly or lastly added to the candidate list. In addition, the block information may be added to a predetermined position between the encoder and decoder in the candidate list or may be added to an arbitrary position signaled from the encoder to the decoder.

As another example, when at least one of the block information of the current block is included in the candidate list, a maximum number of candidates in the candidate list may be considered. If the number of candidates currently included in the candidate list is a maximum number of candidates, the block information of the current block may not be included in the candidate list.

For example, the maximum number of candidates in the candidate list may be determined as P. Here, P may be a positive integer including 0. For example, P may be 5. P may be determined based on at least one of the coding parameters of the current block or the coding parameter of the candidate. In addition, P may be predetermined in the encoder/decoder or signaled from the encoder to the decoder.

Candidates in the candidate list according to the present invention may be added to or included in at least one of an intra prediction mode candidate list, a primary MPM (Most Probable Mode) list, a secondary MPM list, a residual intra prediction mode candidate list, a motion vector candidate list, a merge candidate list, an IBC motion vector candidate list, an IBC merge candidate list, a subblock motion vector candidate list, or a subblock merge candidate list.

Here, the primary MPM list may be an intra prediction mode candidate list including at least one of an intra prediction mode of a spatial neighboring block, a derived intra prediction mode (derived mode) as a result of adding or subtracting a specific value to or from the intra prediction mode of a spatial neighboring block or a base intra predic- tion mode. At this time, the base intra prediction mode may be at least one of a DC mode, a PLANAR mode, a vertical mode or a horizontal mode. The specific value may be at least one of 0, a positive integer or a negative integer. The specific value may be determined based on at least one of the coding parameter of the current block or the coding param- eter of the candidate. In addition, the specific value may be predetermined in the encoder/decoder or signaled from the encoder to the decoder.

The secondary MPM list may be an intra prediction mode candidate list composed of intra prediction modes which are not included in the primary MPM list. If the candidate in the primary MPM list is not determined as the intra prediction mode in the current block, the candidate in the secondary MPM list may be determined as the intra prediction mode.

The residual intra prediction mode candidate list may be an intra prediction mode candidate list composed of the intra prediction modes which are not included in at least one of the primary MPM list or the secondary MPM list. If the candidate included in at least one of the primary MPM list or the secondary MPM list is not determined as the intra prediction mode in the current block, the candidate in the residual intra prediction mode candidate list may be deter- mined as the intra prediction mode.

Accordingly, the intra prediction mode candidate list may mean at least one of the primary MPM list, the secondary MPM list or the residual intra prediction mode candidate list.

For example, the candidate in the candidate list may be included in the intra prediction mode candidate list at a specific position or in specific order.

For example, the candidate in the candidate list may be firstly included in the intra prediction mode candidate list. As another example, the candidate in the candidate list may be lastly included in the intra prediction mode candidate list. As another example, the candidate in the candidate list may be included before at least one of the spatial intra prediction modes in the intra prediction mode candidate list. As another example, the candidate in the candidate list may be included after at least one of the spatial intra prediction modes in the intra prediction mode candidate list. As another example, the candidate in the candidate list may be included before at least one of the derived intra prediction modes in the intra prediction mode candidate list. As another example, the candidate in the candidate list may be included after at least one of the derived intra prediction modes in the intra prediction mode candidate list. As another example, the candidate in the candidate list may be included before at least one of the base intra prediction modes in the intra prediction mode candidate list. As another example, the candidate in the candidate list may be included after at least one of the base intra prediction modes in the intra prediction mode candidate list.

As another example, the candidate in the candidate list may be included in the motion vector candidate list at a specific position or in specific order.

For example, the candidate in the candidate list may be firstly included in the motion vector candidate list. As another example, the candidate in the candidate list may be lastly included in the motion vector candidate list. As another example, the candidate in the candidate list may be included before at least one of the spatial motion vectors in the motion vector candidate list. As another example, the candidate in the candidate list may be included after at least one of the spatial motion vectors in the motion vector candidate list. As another example, the candidate in the candidate list may be included before at least one of the temporal motion vectors in the motion vector candidate list. As another example, the candidate in the candidate list may be included after at least one of the temporal motion vectors in the motion vector candidate list. As another example, the candidate in the candidate list may be included before at least one of the zero motion vectors in the motion vector candidate list. As another example, the candidate in the candidate list may be included after at least one of the zero motion vectors in the motion vector candidate list.

As another example, the candidate in the candidate list may be included in the merge candidate list at a specific position or in specific order.

For example, the candidate in the candidate list may be firstly included in the merge candidate list. As another example, the candidate in the candidate list may be lastly included in the merge candidate list. As another example, the candidate in the candidate list may be included before at least one of the spatial merge candidates in the merge candidate list. As another example, the candidate in the candidate list may be included after at least one of the spatial merge candidates in the merge candidate list. As another example, the candidate in the candidate list may be included before at least one of the temporal merge candidates in the merge candidate list. As another example, the candidate in the candidate list may be included after at least one of the temporal merge candidates in the merge candidate list. As another example, the candidate in the candidate list may be included before at least one of the combined merge candidates in the merge candidate list. As another example, the candidate in the candidate list may be included after at least one of the combined merge candidates in the merge candidate list. As another example, the candidate in the candidate list may be included before at least one of the zero merge candidates in the merge candidate list. As another example, the candidate in the candidate list may be included after at least one of the zero merge candidates in the merge candidate list.

As another example, the candidate in the candidate list may be included in the IBC block vector candidate list at a specific position or in specific order. At this time, the candidate in the candidate list may be block vector information.

For example, the candidate in the candidate list may be firstly included in the IBC block vector candidate list. As another example, the candidate in the candidate list may be lastly included in the IBC block vector candidate list. As another example, the candidate in the candidate list may be included before a lastly included zero vector of the IBC block vector candidate list. As another example, the candidate in the candidate list may be included before at least one of the IBC block vector candidates in the IBC block vector candidate list. As another example, the candidate in the candidate list may be included after at least one of the IBC block vector candidates in the IBC block vector candidate list. As another example, the candidate in the candidate list may be included before at least one of the combined IBC block vector candidates in the IBC block vector candidate list. As another example, the candidate in the candidate list may be included after at least one of the combined IBC block vector candidates in the IBC block vector candidate list.

As another example, the candidate in the candidate list may be included in the subblock motion vector candidate list at a specific position or in specific order.

As another example, the candidate in the candidate list may be included in the subblock merge candidate list at a specific position or in specific order.

In the above-described examples, the combined merge candidate may be a merge candidate generated by combining at least one of the candidates in the merge candidate list. An average of at least one of the vector values of the candidates may be used when the combined merge candidate is generated. For example, in the above-described example, the combined merge candidate may mean a merge candidate generated by calculating an average of the vector values of two merge candidates.

The candidate list according to the present invention may be initialized at the start point of a sequence, a picture, a subpicture, a slice, a tile, a brick, a CTU boundary, a CTU row and a CTU column. That is, the candidates in the candidate list may be all deleted in units of sequences, pictures, subpictures, slices, tiles, bricks, CTU boundaries, CTU rows and CTU columns or initialized to at least one specific value.

For example, the candidate list may be initialized to the value of information on a block having a specific value. The specific value may be at least one of 0, a positive integer or a negative integer. The specific value may be determined based on at least one of the coding parameters of the current block or the coding parameter of the candidate. In addition, the specific value may be predetermined in the encoder/decoder or signaled from the encoder to the decoder.

At this time, the specific value may be a value corresponding to one of intra prediction modes or a value corresponding to a temporal motion vector.

For example, the specific value may be a value indicating a PLANAR mode or a DC mode which is a non-directional intra prediction mode.

As another example, the specific value may be a motion vector value of a corresponding position block in a corresponding position image. That is, the specific value may be a temporal motion vector.

As another example, the specific value may be a subblock unit motion vector value of a corresponding position block in a corresponding position image. That is, the specific value may be a subblock unit temporal motion vector value (or a subblock unit temporal motion vector value).

As another example, the specific value may be a zero (0, 0) motion vector or an IBC motion vector value.

When the block information of the current block is added to the candidate list according to the present invention, in order to prevent the same or similar block information from being included in the candidate list, redundancy check may be performed between at least one of the information on the block included in the candidate list and information on the current block. As the result of redundancy check, at least one of the block information of the current block may not be included in the candidate list. In addition, as the result of redundancy check, at least one of the information on the blocks included in the candidate list may be removed, and at least one of the block information of the current block may be included in the candidate list.

Redundancy check may be performed only with respect to M candidates located at the beginning of the candidate list. As another example, redundancy check may be performed only with respect to M candidates located at the end of the candidate list. Here, M may be a positive integer including 0. For example, M may be 1 or 2. M may be determined based on at least one of the coding parameters of the current block or the coding parameter of the candidate. In addition, M may be predetermined in the encoder/decoder or signaled from the encoder to the decoder.

For example, if at least one of the block information of the current block to be included and at least one of the information on the block included in the candidate list are different, at least one of the block information of the current block to be included may be included in the candidate list.

For example, at least one of the block information of the current block to be included may be first added to the candidate list. As another example, at least one of the block information of the current block to be included may be last added to the candidate list.

In addition, through one of the embodiments in which the specific candidate or candidate information is included in the candidate list at the specific position or in specific order, the block information of the current block may be included in the candidate list.

As another example, if at least one of the block information of the current block to be included and at least one of the information on the block included in the candidate list are the same, at least one of the block information of the current block to be included may not be included in the candidate list.

As another example, if at least one of the block information of the current block to be included and at least one of the information on the block included in the candidate list are similar to each other, at least one of the block information of the current block to be included may not be included in the candidate list.

For example, whether the information on the block included in the candidate list is similar may be determined via an absolute value of an intra prediction mode value, a motion vector value or an IBC motion vector value.

For example, if the absolute value of a difference between the value of the intra prediction mode to be included and the value of the intra prediction mode included in the candidate list is less than or equal to T, the intra prediction mode to be included may not be included in the candidate list. As another example, if the absolute value of a difference between the value of the motion vector or IBC motion vector to be included and the value of the motion vector or IBC motion vector included in the candidate list is less than or equal to T, the motion vector or IBC motion vector to be included may not be included in the candidate list. As another example, if the absolute value of a difference between the X component value of the motion vector or IBC motion vector to be included and the X component value of the motion vector or IBC motion vector included in the candidate list is less than or equal to T, the motion vector or IBC motion vector to be included may not be included in the candidate list. As another example, if the absolute value of a difference between the Y component value of the motion vector or IBC motion vector to be included and the Y component value of the motion vector or IBC motion vector included in the candidate list is less than or equal to T, the motion vector or IBC motion vector to be included may not be included in the candidate list.

As another example, if at least one of the block information of the current block to be included and at least one of the information on the block included in the candidate list are not similar to each other, at least one of the block information of a new current block to be included may not be included in the candidate list.

For example, whether the information on the block included in the candidate list is similar may be determined through an absolute value of an intra prediction mode value, a motion vector value or an IBC motion vector.

For example, if the absolute value of a difference between the value of the intra prediction mode to be included and the value of the intra prediction mode included in the candidate list is greater than T, the intra prediction mode to be included may not be included in the candidate list. As another example, if the absolute value of a difference between the value of the motion vector or IBC motion vector to be included and the value of the motion vector or IBC motion vector included in the candidate list is greater than T, the motion vector or IBC motion vector to be included may not be included in the candidate list. As another example, if the absolute value of a difference between the X component value of the motion vector or IBC motion vector to be included and the X component value of the motion vector or IBC motion vector included in the candidate list is greater than T, the motion vector or IBC motion vector to be included may not be included in the candidate list. As another example, if the absolute value of a difference between the Y component value of the motion vector or IBC motion vector to be included and the Y component value of the motion vector or IBC motion vector included in the candidate list is greater than T, the motion vector or IBC motion vector to be included may not be included in the candidate list.

At this time, T may be a positive integer including 0. T may be determined based on at least one of the coding parameters of the current block or the coding parameter of the candidate. In addition, T may be predetermined in the encoder/decoder or signaled from the encoder to the decoder.

In addition, T in the motion vector or IBC motion vector may be a value representing at least one of an M/N pixel unit such as an integer pixel unit, a ½ pixel unit, a ¼ pixel unit, a ¹⁄₁₆ pixel unit, etc. Here, M and N may be positive integers. M and N may be determined based on at least one of the coding parameters of the current block or the coding parameter of the candidate. In addition, M and N may be predetermined in the encoder/decoder or signaled from the encoder to the decoder.

The following description relates to redundancy check between the candidate in the candidate list and the candidate in at least one of an intra prediction mode candidate list, a motion vector candidate list, a merge candidate list, an IBC motion vector candidate list, an IBC merge candidate list, a subblock motion vector candidate list, or a subblock merge candidate list, if at least one of the candidates in the candidate list is added to at least one of the intra prediction mode candidate list, the motion vector candidate list, the merge candidate list, the IBC motion vector candidate list, the IBC merge candidate list, the subblock motion vector candidate list or the subblock merge candidate list.

When at least one of the candidates in the candidate list is added to at least one of the intra prediction mode candidate list, the motion vector candidate list, the merge candidate list, the MC motion vector candidate list, the MC merge candidate list, the subblock motion vector candidate list or the subblock merge candidate list, redundancy check between the candidate in the candidate list and at least one of the candidates included in at least one of the intra prediction mode candidate list, the motion vector candidate list, the merge candidate list, the IBC motion vector candidate list, the MC merge candidate list, the subblock motion vector candidate list or the subblock merge candidate list may be performed.

For example, at least one of the candidates in the candidate list may be first or lastly included in at least one of the intra prediction mode candidate list, the motion vector candidate list, the merge candidate list, the MC motion vector candidate list, the MC merge candidate list, the subblock motion vector candidate list or the subblock merge candidate list. In addition, through one of the embodiments in which the specific candidate or candidate information is included in the candidate list at the specific position or in specific order, the block information of the current block may be included in the candidate list.

In order to prevent the same or similar candidates from being added to at least one of the candidate list or the intra prediction mode candidate list, the motion vector candidate list, the merge candidate list, the MC motion vector candidate list, the MC merge candidate list, the subblock motion vector candidate list or the subblock merge candidate list, redundancy check between at least one of the candidates in the candidate list and the candidate included in at least one of the intra prediction mode candidate list, the motion vector candidate list, the merge candidate list, the MC motion vector candidate list, the MC merge candidate list, the subblock motion vector candidate list or the subblock merge candidate list may be performed. As the result of redundancy check, at least one of the candidates in the candidate list may or may not be included in at least one of the intra prediction mode candidate list, the motion vector candidate list, the merge candidate list, the IBC motion vector candidate list, the IBC merge candidate list, the subblock motion vector candidate list or the subblock merge candidate list.

Redundancy check may be performed only with respect to M candidates located at the beginning of the candidate list. As another example, redundancy check may be performed only with respect to M candidates located at the end of the candidate list. Here, M may be a positive integer including 0. For example, M may be 1 or 2. M may be determined based on at least one of the coding parameters of the current block or the coding parameter of the candidate. In addition, M may be predetermined in the encoder/decoder or signaled from the encoder to the decoder. At this time, redundancy check may be performed between the upper or left spatial motion vectors of the current block and one or two candidates at the beginning of the candidate list.

For example, if at least one of the information on the block in the candidate list to be included is different from at least one of the information on the block included in at least one of the intra prediction mode candidate list, the motion vector candidate list, the merge candidate list, the IBC motion vector candidate list, the IBC merge candidate list, the subblock motion vector candidate list or the subblock merge candidate list, at least one of the information on the block in the candidate list to be included may be included in at least one of the intra prediction mode candidate list, the motion vector candidate list, the merge candidate list, the IBC motion vector candidate list, the IBC merge candidate list, the subblock motion vector candidate list or the subblock merge candidate list.

For example, at least one of the information on the block in the candidate list may be included in at least one of the intra prediction mode candidate list, the motion vector candidate list, the merge candidate list, the IBC motion vector candidate list, the IBC merge candidate list, the subblock motion vector candidate list or the subblock merge candidate list in ascending order of indices.

In addition, at least one of the information on the block in the candidate list may be included in at least one of the intra prediction mode candidate list, the motion vector candidate list, the merge candidate list, the MC motion vector candidate list, the MC merge candidate list, the subblock motion vector candidate list or the subblock merge candidate list in ascending order of indices.

As another example, if at least one of the information on the block in the candidate list to be included is equal to at least one of the information on the block included in at least one of the intra prediction mode candidate list, the motion vector candidate list, the merge candidate list, the MC motion vector candidate list, the MC merge candidate list, the subblock motion vector candidate list or the subblock merge candidate list, at least one of the information on the block in the candidate list to be included may not be included in at least one of the intra prediction mode candidate list, the motion vector candidate list, the merge candidate list, the IBC motion vector candidate list, the IBC merge candidate list, the subblock motion vector candidate list or the subblock merge candidate list.

As another example, if at least one of the information on the block in the candidate list to be included is similar to at least one of the information on the block included in at least one of the intra prediction mode candidate list, the motion vector candidate list, the merge candidate list, the IBC motion vector candidate list, the IBC merge candidate list, the subblock motion vector candidate list or the subblock merge candidate list, at least one of the information on the block in the candidate list to be included may not be included in at least one of the intra prediction mode candidate list, the motion vector candidate list, the merge candidate list, the IBC motion vector candidate list, the IBC merge candidate list, the subblock motion vector candidate list or the subblock merge candidate list.

At this time, the case where at least one of the information on the block in the candidate list to be included is similar to at least one of the information on the block included in at least one of the intra prediction mode candidate list, the motion vector candidate list, the merge candidate list, the MC motion vector candidate list, the IBC merge candidate list, the subblock motion vector candidate list or the subblock merge candidate list may mean one of the following conditions.

For example, if the absolute value of a difference between the value of the intra prediction mode to be included and the value of the intra prediction mode included in the intra prediction mode candidate list is less than or equal to S, the intra prediction mode to be included may not be included in the intra prediction mode candidate list.

For example, if the absolute value of a difference between the value of the motion vector or IBC motion vector to be included and the value of the motion vector or MC motion vector included in at least one of the motion vector candidate list, the merge candidate list, the MC motion vector candidate list, the MC merge candidate list, the subblock motion vector candidate list or the subblock merge candidate list is less than or equal to S, the motion vector or MC motion vector to be included may not be included in at least one of the motion vector candidate list, the merge candidate list, the MC motion vector candidate list, the MC merge candidate list, the subblock motion vector candidate list, or the subblock merge candidate list.

For example, if the absolute value of a difference between the X component value of the motion vector or IBC motion vector to be included and the X component value of the motion vector or IBC motion vector included in at least one of the motion vector candidate list, the merge candidate list, the IBC motion vector candidate list, the IBC merge candidate list, the subblock motion vector candidate list or the subblock merge candidate list is less than or equal to S, the motion vector or IBC motion vector to be included may not be included in at least one of the motion vector candidate list, the merge candidate list, the IBC motion vector candidate list, the IBC merge candidate list, the subblock motion vector candidate list or the subblock merge candidate list.

For example, if the absolute value of a difference between the Y component value of the motion vector or IBC motion vector to be included and the Y component value of the motion vector or IBC motion vector included in at least one of the motion vector candidate list, the merge candidate list, the IBC motion vector candidate list, the IBC merge candidate list, the subblock motion vector candidate list or the subblock merge candidate list is less than or equal to S, the motion vector or IBC motion vector to be included may not be included in at least one of the motion vector candidate list, the merge candidate list, the IBC motion vector candidate list, the IBC merge candidate list, the subblock motion vector candidate list or the subblock merge candidate list.

As another example, if at least one of the information on the block in the candidate list to be included is not similar to at least one of the information included in at least one of the block included in at least one of the intra prediction mode candidate list, the motion vector candidate list, the merge candidate list, the IBC motion vector candidate list, the IBC merge candidate list, the subblock motion vector candidate list or the subblock merge candidate list, at least one of the information on the block in the candidate list to be included may not be included in at least one of the intra prediction mode candidate list, the motion vector candidate list, the merge candidate list, the IBC motion vector candidate list, the IBC merge candidate list, the subblock motion vector candidate list or the subblock merge candidate list.

At this time, the case where at least one of the information on the block in the candidate list to be included is not similar to at least one of the information on the block included in at least one of the intra prediction mode candidate list, the motion vector candidate list, the merge candidate list, the IBC motion vector candidate list, the IBC merge candidate list, the subblock motion vector candidate list or the subblock merge candidate list may mean one of the following conditions.

For example, if the absolute value of a difference between the value of the intra prediction mode to be included and the value of the intra prediction mode included in the intra prediction mode candidate list is greater than S, the intra prediction mode to be included may not be included in the intra prediction mode candidate list.

For example, if the absolute value of a difference between the value of the motion vector or IBC motion vector to be included and the value of the motion vector or IBC motion vector included in at least one of the motion vector candidate list, the merge candidate list, the IBC motion vector candidate list, the IBC merge candidate list, the subblock motion vector candidate list or the subblock merge candidate list is greater than S, the motion vector or IBC motion vector to be included may not be included in at least one of the motion vector candidate list, the merge candidate list, the IBC motion vector candidate list, the IBC merge candidate list, the subblock motion vector candidate list or the subblock merge candidate list.

For example, if the absolute value of a difference between the X component value of the motion vector or IBC motion vector to be included and the X component value of the motion vector or IBC motion vector included in at least one of the motion vector candidate list, the merge candidate list, the IBC motion vector candidate list, the IBC merge candidate list, the subblock motion vector candidate list or the subblock merge candidate list is greater than S, the motion vector or IBC motion vector to be included may not be included in at least one of the motion vector candidate list, the merge candidate list, the IBC motion vector candidate list, the IBC merge candidate list, the subblock motion vector candidate list or the subblock merge candidate list.

For example, if the absolute value of a difference between the Y component value of the motion vector or IBC motion vector to be included and the Y component value of the motion vector or IBC motion vector included in at least one of the motion vector candidate list, the merge candidate list, the IBC motion vector candidate list, the IBC merge candidate list, the subblock motion vector candidate list or the subblock merge candidate list is greater than S, the motion vector or IBC motion vector to be included may not be included in at least one of the motion vector candidate list, the merge candidate list, the IBC motion vector candidate list, the IBC merge candidate list, the subblock motion vector candidate list or the subblock merge candidate list.

In the above description, S may be a positive integer including 0. S may be determined based on at least one of the coding parameters of the current block or the coding parameter of the candidate. In addition, S may be predetermined in the encoder/decoder or signaled from the encoder to the decoder. In addition, in the case of the motion vector or IBC motion vector, S may be a value representing at least one of an M/N pixel unit such as an integer pixel unit, a ½ pixel unit, a ¼ pixel unit, a 1/16 pixel unit, etc. Here, M and N may be positive integers.

Redundancy check between at least one of the candidates in the candidate list and a candidate included in at least one of the intra prediction mode candidate list, the motion vector candidate list, the merge candidate list, the IBC motion vector candidate list, the IBC merge candidate list, the subblock motion vector candidate list or the subblock merge candidate list may be performed. As the result of redundancy check, at least one of the candidates included at least one of the intra prediction mode candidate list, the motion vector candidate list, the merge candidate list, the IBC motion vector candidate list, the IBC merge candidate list, the subblock motion vector candidate list or the subblock merge candidate list may be removed, and at least one of the candidates in the candidate list may be included in at least one of the intra prediction mode candidate list, the motion vector candidate list, the merge candidate list, the IBC motion vector candidate list, the IBC merge candidate list, the subblock motion vector candidate list or the subblock merge candidate list.

For example, at least one of the candidates in the candidate list may be first or lastly included in at least one of the intra prediction mode candidate list, the motion vector candidate list, the merge candidate list, the IBC motion vector candidate list, the IBC merge candidate list, the subblock motion vector candidate list or the subblock merge candidate list.

The candidate list according to the present invention may manage candidates by FIFO (First-In-First-Out) rules. For example, if a new candidate needs to be added to the candidate list and the number of candidates in the candidate list is equal to a maximum number of candidates, a firstly added candidate may be firstly removed from the candidate list and the new candidate may be added to the candidate list.

For example, the new candidate may be first or last added to the candidate list.

For example, the candidate list according to the present invention may include at least one of information on the intra prediction mode.

As another example, the candidate list may include the intra prediction mode of a spatial neighboring block. As another example, the candidate list may include a derived intra prediction mode which is a result of subtracting or adding a specific value from or to the intra prediction mode of the spatial neighboring block. As another example, the candidate list may include a base intra prediction mode. As another example, the candidate list may include a spatial motion vector or a spatial merge candidate.

As another example, the candidate list may include an IBC merge candidate or a motion vector of an intra block copy (IBC) mode using a current image as a reference image. As another example, the candidate list may include a temporal motion vector or a temporal merge candidate. As another example, the candidate list may include a subblock unit motion vector or a subblock unit merge candidate. As another example, the candidate list may include a motion vector of a subblock unit IBC mode or a subblock unit IBC merge candidate. As another example, the candidate list may include a subblock unit temporal motion vector or a subblock unit temporal merge candidate. At this time, the subblock may have the same meaning as the subblock.

As another example, the candidate list may include a spatial motion vector or a spatial merge candidate in CTU units. As another example, the candidate list may include an IBC motion vector or an IBC merge candidate in CTU units. As another example, the candidate list may include a temporal motion vector a temporal merge candidate of a corresponding position CTU in CTU units. As another example, the candidate list may include a subblock unit motion vector or a subblock unit merge candidate of a corresponding position CTU in CTU units. As another example, the candidate list may include a subblock unit IBC motion vector or a subblock unit IBC merge candidate of a corresponding position CTU in CTU units. As another example, the candidate list may include a subblock unit temporal motion vector or a subblock unit temporal merge candidate of a corresponding position CTU in CTU units.

As another example, the candidate list may include a spatial motion vector or a spatial merge candidate but may not include a temporal motion vector or a temporal merge candidate. As another example, the candidate list may include a spatial motion vector, a spatial merge candidate, an IBC motion vector or an MC merge candidate, but may not include a temporal motion vector or a temporal merge candidate. As another example, the candidate list may include a temporal motion vector or a temporal merge candidate, but may not include a spatial motion vector or a spatial merge candidate. As another example, the candidate list may include a spatial motion vector, a spatial merge candidate, a temporal motion vector or a temporal merge candidate. As another example, the candidate list may include a spatial motion vector, a spatial merge candidate, a temporal motion vector or a temporal merge candidate, but may not include a subblock unit motion vector or a subblock unit merge candidate. As another example, the candidate list may include a spatial motion vector, a spatial merge candidate, a temporal motion vector or a temporal merge candidate, but may not include a subblock unit motion vector, a subblock unit merge candidate, an MC motion vector or an MC merge mode.

As another example, the candidate list may include only an MC motion vector or an MC merge candidate. As another example, the candidate list may include a spatial motion vector or a spatial merge candidate in CTU units, but may not include a temporal motion vector or a temporal merge candidate. As another example, the candidate list may include a temporal motion vector or a temporal merge candidate in CTU units, but may not include a spatial motion vector or a spatial merge candidate. As another example, the candidate list may include a spatial motion vector, a spatial merge candidate, a temporal motion vector or a temporal merge candidate in CTU units. As another example, the candidate list may include only an IBC motion vector or an IBC merge candidate in CTU units.

If a specific block is at a boundary of at least one of a picture, a subpicture, a slice, a tile, a brick, a CTU boundary, a CTU row or a CTU column or crosses the boundary of at least one of a picture, a subpicture, a slice, a tile, a brick, a CTU boundary, a CTU row or a CTU column, at least one of information on the specific block may be included in the candidate list. At this time, the candidate list may be used to replace a line buffer.

For example, if a specific block is at an upper picture, subpicture, slice, tile, brick, CTU boundary, CTU row and CTU column of the current block or if the specific block is at the boundary of an upper picture, subpicture, slice, tile, brick, CTU boundary, CTU row and CTU column, to which the current block does not belong, or if the specific block crosses the upper boundary of a picture, subpicture, slice, tile, brick, CTU boundary, CTU row and CTU column, to which the current block belongs, at least one of the information on the specific block may be included in the candidate list.

As another example, if a specific block is at a left picture, subpicture, slice, tile, brick, CTU boundary, CTU row and CTU column of the current block or if the specific block is at the boundary of a left picture, subpicture, slice, tile, brick, CTU boundary, CTU row and CTU column, to which the current block does not belong, or if the specific block crosses the left boundary of a picture, subpicture, slice, tile, brick, CTU boundary, CTU row and CTU column, to which the current block belongs, at least one of the information on the specific block may be included in the candidate list.

In addition, If a specific block is at a boundary of at least one of a picture, a subpicture, a slice, a tile, a brick, a CTU boundary, a CTU row or a CTU column or crosses the boundary of at least one of a picture, a subpicture, a slice, a tile, a brick, a CTU boundary, a CTU row or a CTU column, at least one of information on the specific block may not be included in the candidate list. At this time, since the information on the specific block is not included in the candidate list, a line buffer may be removed.

For example, if a specific block is at an upper picture, subpicture, slice, tile, brick, CTU boundary, CTU row and CTU column of the current block or if the specific block is at the boundary of an upper picture, subpicture, slice, tile, brick, CTU boundary, CTU row and CTU column, to which the current block does not belong, or if the specific block crosses the upper boundary of a picture, subpicture, slice, tile, brick, CTU boundary, CTU row and CTU column, to which the current block belongs, at least one of the information on the specific block may not be included in the candidate list.

As another example, if a specific block is at a left picture, subpicture, slice, tile, brick, CTU boundary, CTU row and CTU column of the current block or if the specific block is at the boundary of a left picture, subpicture, slice, tile, brick, CTU boundary, CTU row and CTU column, to which the current block does not belong, or if the specific block crosses the left boundary of a picture, subpicture, slice, tile, brick, CTU boundary, CTU row and CTU column, to which the current block belongs, at least one of the information on the specific block may not be included in the candidate list.

In addition, if a block related to block information already included in the candidate list and the current block belong to different pictures, subpictures, slices, tiles, bricks, CTU boundaries, CTU rows and CTU columns, at least one of the information on the current block may not be included in the candidate list.

That is, when the block information of the current block is added to the candidate list for a specific block, if the specific block and the current block are located at or belong to different pictures, subpictures, slices, tiles, bricks, CTU boundaries, CTU rows and CTU columns, at least one of the information on the current block may not be included in the candidate list for the specific block.

When a candidate is added to the candidate list, a specific candidate having a result of adding or subtracting a specific value to or from at least one of the information on the block for the candidate as block information may be added to the candidate list.

For example, a specific candidate having a new intra prediction mode may be added to the candidate list using a result of adding or subtracting a specific value to or from the intra prediction mode of a candidate to be included in the candidate list as the new intra prediction mode.

As another example, a specific candidate having a new motion vector may be added to the candidate list using a result of adding or subtracting a specific value to or from the motion vector of a candidate to be included in the candidate list as the new motion vector.

In addition, when the candidate is added to the candidate list, the candidate may not be added to the candidate list but a specific candidate having a result of adding or subtracting a specific value to or from at least one of the information on the block for the candidate as block information may be added to the candidate list.

In addition, when at least one of candidates is added to the candidate list, a specific candidate having a result of calculating a statistical value with respect to at least one of the information on the block for at least one of the candidates as block information may be added to the candidate list.

In addition, a specific candidate having a result of adding or subtracting a specific value to or from at least one of the information on the block for the candidate included in the candidate list as block information may be added to the candidate list.

For example, a specific candidate having a new intra prediction mode may be added to the candidate list, using a result of adding or subtracting a specific value to or from the intra prediction mode of the candidate included in the candidate list as the new intra prediction mode.

As another example, a specific candidate having a new motion vector may be added to the candidate list, using a result of adding or subtracting a specific value to or from the motion vector of the candidate included in the candidate list as the new motion vector.

In addition, a specific candidate having a result of adding or subtracting a specific value to or from at least one of the information on the block for the candidate included in the candidate list as block information may be added, and the candidate already included in the candidate list may be excluded from the candidate list.

In addition, a specific candidate having a result of calculating a statistical value with respect to at least one of the information on the block for at least one of the candidates included in the candidate list as block information may be added to the candidate list.

At this time, the specific value may be at least one of 0, a positive integer or a negative integer. The specific value may be determined based on at least one of the coding parameters of the current block or the coding parameter of the candidate. In addition, the specific value may be predetermined in the encoder/decoder or signaled from the encoder to the decoder.

The candidate list according to the present invention may be used when at least one of the intra prediction mode candidate list, the motion vector candidate list, the merge candidate list, the IBC motion vector candidate list, the IBC merge candidate list, the subblock motion vector candidate list or the subblock merge candidate list is constructed.

For example, the candidate in the candidate list may be used as a candidate when the intra prediction mode candidate list is constructed. For example, the candidate of the candidate list may be included in the intra prediction mode candidate list.

As another example, the candidate in the candidate list may be used as a candidate when the motion vector candidate list is constructed. For example, the candidate of the candidate list may be included in the motion vector candidate list.

As another example, the candidate in the candidate list may be used as a candidate when the merge candidate list is constructed. For example, the candidate of the candidate list may be included in the merge candidate list.

As another example, the candidate in the candidate list may be used as a candidate when the subblock motion vector candidate list is constructed. For example, the candidate of the candidate list may be included in the subblock motion vector candidate list.

As another example, the candidate in the candidate list may be used as a candidate when the subblock merge candidate list is constructed. For example, the candidate of the candidate list may be included in the subblock merge candidate list.

Figures 24, 25:
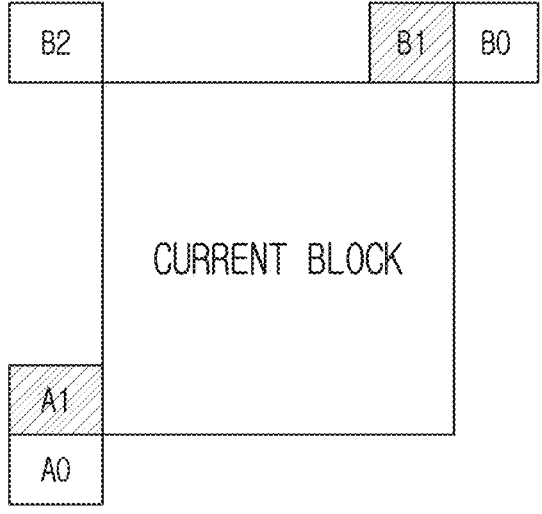
FIG. 24 is a view illustrating a process of adding candidates in a candidate list as candidates of an intra prediction mode candidate list, a motion vector candidate list or a merge candidate list, according to an embodiment of the present invention.
FIG. 25 is a view illustrating an embodiment of neighboring blocks used when an intra prediction mode candidate list, a motion vector candidate list or a merge candidate list is constructed.

FIG. 24 is a view illustrating a process of adding candidates in a candidate list as candidates of an intra prediction mode candidate list, a motion vector candidate list or a merge candidate list, according to an embodiment of the present invention.

If at least one candidate in the candidate list is used when at least one of the intra prediction mode candidate list, the motion vector candidate list or the merge candidate list is constructed, a candidate first added to the candidate list may be first added to the intra prediction mode candidate list, the motion vector candidate list or the merge candidate list. At this time, the maximum number of candidates in the intra prediction mode candidate list, the motion vector candidate list or merge candidate list is not reached, a next candidate in the candidate list may be included in the intra prediction mode candidate list, the motion vector candidate list or the merge candidate list.

For example, as shown in FIG. 24, if the candidates in the candidate list are included in order of H0, H1, H2, H3 and H4, the candidate H0 firstly included in the candidate list may be first used as the candidate of the intra prediction mode candidate list, the motion vector candidate list or the merge candidate list.

At this time, if the maximum number of candidates of the intra prediction mode candidate list, the motion vector candidate list or the merge candidate list is not reached, a next candidate H1 may be used as the candidate of the intra prediction mode candidate list, the motion vector candidate list or the merge candidate list.

In adding of at least one candidate in the candidate list to the intra prediction mode candidate list, the motion vector candidate list or the merge candidate list as the candidate by the above-described method, redundancy check with the candidates in the intra prediction mode candidate list, the motion vector candidate list or the merge candidate list may be performed only with respect to M candidates in the candidate list. Here, M may be a positive integer including "0".

For example, as shown in FIG. 24, if a candidate H0 firstly included in the candidate list is first added to the intra prediction mode candidate list, the motion vector candidate list or the merge candidate list as the candidate, redundancy check with the candidates in the intra prediction mode candidate list, the motion vector candidate list or the merge candidate list may be performed only with respect to the candidates H0 and H. At this time, if redundancy check is performed with respect to the first candidate H0 and the same candidate is present, the candidate H0 may not be included. If redundancy check is performed with respect to the next candidate H1 and the same candidate is not present, the candidate H1 may be added to the intra prediction mode candidate list, the motion vector candidate list or the merge candidate list as the candidate. In addition, if the maximum number of candidates in the intra prediction mode candidate list, the motion vector candidate list or the merge candidate list is not reached and the candidate H2, H3 or H4 is sequentially added to the candidate list, redundancy check with the candidates of the candidate list may not be performed.

As another example, as shown in FIG. 24, if the candidate H0 firstly included in the candidate list is firstly included in the intra prediction mode candidate list, the motion vector candidate list or the merge candidate list as the candidate, redundancy check with the candidates in the intra prediction mode candidate list, the motion vector candidate list or the merge candidate list may be performed only with respect to the candidates H3 and H4. For example, if the number of candidates in the intra prediction mode candidate list, the motion vector candidate list or the merge candidate list does not reach the maximum number of candidates, the candidate H3 or H4 is added and, if redundancy check is first performed with respect to the candidate H3 and the same candidate is present, the candidate H3 may not be added. If redundancy check is performed with respect to the next candidate H4 and the same candidate is not present, the candidate H4 may be added to the intra prediction mode candidate list, the motion vector candidate list or the merge candidate list as the candidate. At this time, when the candidates H0, H1 and H2 are added to the intra prediction mode candidate list, the motion vector candidate list or the merge candidate list, redundancy check with the candidates in each candidate list may not be performed.

FIG. 25 is a view illustrating an embodiment of neighboring blocks used when an intra prediction mode candidate list, a motion vector candidate list or a merge candidate list is constructed.

In adding of at least one candidate in the candidate list to the intra prediction mode candidate list, the motion vector candidate list or the merge candidate list as the candidate by the same method as the above-described embodiments, redundancy check with N neighboring blocks constructing the intra prediction mode candidate list, the motion vector candidate list or the merge candidate list may be performed only with respect to M candidates in the candidate list. Here, M may be a positive integer including "0" and N may be a positive integer greater than 0.

For example, as shown in FIG. 24, if the candidate H0 firstly included in the candidate list is added to the intra prediction mode candidate list, the motion vector candidate list or the merge candidate list as the candidate, redundancy check with the neighboring blocks used when the intra prediction mode candidate list, the motion vector candidate list or the merge candidate list is constructed may be performed only with respect to the candidates H0 and H. For example, if the neighboring block is used to construct the intra prediction mode candidate list, the motion vector candidate list or the merge candidate list as shown in FIG. 25, redundancy check with the neighboring blocks A1 and B1 may be first performed with respect to the candidate H0. As a result, if the same candidate is present, the candidate H0 may not be added to the intra prediction mode candidate list, the motion vector candidate list or the merge candidate list. If redundancy check with the neighboring blocks A1 and B1 is performed with respect to the next candidate H1 and the same candidate is not present, the candidate H1 may be added to the intra prediction mode candidate list, the motion vector candidate list or the merge candidate list as the candidate. At this time, if the maximum number of candidates in the intra prediction mode candidate list, the motion vector candidate list or the merge candidate list is not reached and the candidates H2, H3 and/or H4 are added to the intra prediction mode candidate list, the motion vector candidate list or the merge candidate list, redundancy check with the neighboring blocks may not be performed with respect to the candidates H2, H3 and/or H4.

For example, as shown in FIG. 24, if the candidate H0 firstly included in the candidate list is first added to the intra prediction mode candidate list, the motion vector candidate list or the merge candidate list as the candidate, redundancy check with the neighboring blocks used when the intra prediction mode candidate list, the motion vector candidate list or the merge candidate list is constructed may be performed only with respect to the candidates H3 and H4. For example, if the neighboring blocks are used to construct the intra prediction mode candidate list, the motion vector candidate list or the merge candidate list as shown in FIG. 25 and the number of candidates in the intra prediction mode candidate list, the motion vector candidate list or the merge candidate list does not reach the maximum number of candidates and the candidate H3 or H4 is added, redundancy check with the neighboring blocks A1 and B1 may be sequentially performed with respect to the candidate H3. As a result, if the same candidate as H3 is present, the candidate H3 may not be added to the intra prediction mode candidate list, the motion vector candidate list or the merge candidate list. If redundancy check with the neighboring blocks A1 and B1 is performed with respect to the next candidate H4 and the same candidate is not present, the candidate may be added to the intra prediction mode candidate list, the motion vector candidate list or the merge candidate list as the candidate. At this time, in adding of the candidates H0, H1 and H2 to the intra prediction mode candidate list, the motion vector candidate list or the merge candidate list, redundancy check with the neighboring blocks may not be performed.

In adding of at least one candidate of the candidate list to the intra prediction mode candidate list, the motion vector candidate list or the merge candidate list as the candidate by the above-described method, redundancy check may not be performed with respect to the candidate in the candidate list, and, when the number of candidates in the intra prediction mode candidate list, the motion vector candidate list or the merge candidate list does not satisfy the maximum number of candidates, the candidate in the candidate list may be included until the maximum number of candidates is satisfied.

As another example, in adding of at least one candidate of the candidate list to the intra prediction mode candidate list, the motion vector candidate list or the merge candidate list as the candidate by the above-described method, redundancy check may not be performed with respect to the candidate in the candidate list and, when the number of candidates in the intra prediction mode candidate list, the motion vector candidate list or the merge candidate list does not satisfy the maximum number of candidates, the candidate in the candidate list may be included until the number of candidates satisfies (the maximum number of candidates−1).

Figure 26:
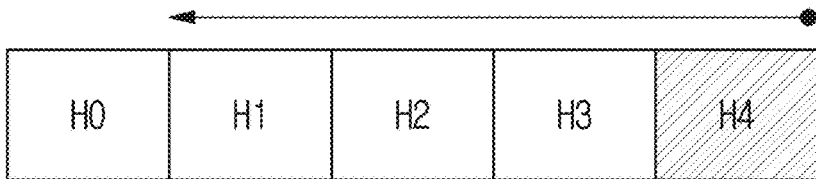
FIG. 26 is a view illustrating a process of adding candidates in the candidate list to an intra prediction mode candidate list, a motion vector candidate list or a merge candidate list according to an embodiment of the present invention.

FIG. 26 is a view illustrating a process of adding candidates in the candidate list to an intra prediction mode candidate list, a motion vector candidate list or a merge candidate list, according to an embodiment of the present invention.

If at least one candidate in the candidate list is used when at least one of the intra prediction mode candidate list, the motion vector candidate list or the merge candidate list is constructed, a candidate last added to the candidate list may be firstly included in the intra prediction mode candidate list, the motion vector candidate list or the merge candidate list. At this time, if the maximum number of candidates in the intra prediction mode candidate list, the motion vector candidate list or the merge candidate list is not reached, the next candidate in the candidate list may be included in the intra prediction mode candidate list, the motion vector candidate list or the merge candidate list.

For example, as shown in FIG. 26, if the candidates in the candidate list are included in order of H0, H1, H2, H3 and H4, the candidate H4 lastly included in the candidate list may be first used as the candidate of the intra prediction mode candidate list, the motion vector candidate list or the merge candidate list. If the maximum number of candidates in the intra prediction mode candidate list, the motion vector candidate list or the merge candidate list is not reached, the next candidate H3 may be used as the candidate of the intra prediction mode candidate list, the motion vector candidate list or the merge candidate list.

In addition, in adding of at least one candidate in the candidate list to the intra prediction mode candidate list, the motion vector candidate list or the merge candidate list as the candidate by the above-described method, redundancy check between the candidates in the intra prediction mode candidate list, the motion vector candidate list or the merge candidate list may be performed only with respect to M candidates in the candidate list. Here, M may be a positive integer including "0".

For example, as shown in FIG. 26, if the candidate H4 lastly included in the candidate list is first added to the intra prediction mode candidate list, the motion vector candidate list or the merge candidate list, redundancy check between the candidates in the intra prediction mode candidate list, the motion vector candidate list or the merge candidate list may be performed only with respect to the candidates H4 and H3. If redundancy check is first performed with respect to the candidate H4 and the same candidate is present, the candidate H4 may not be added. If redundancy check is performed with respect to the next candidate H3 and the same candidate is not present, the candidate H3 may be added to the intra prediction mode candidate list, the motion vector candidate list or the merge candidate list as the candidate.

At this time, if the maximum number of candidates in the intra prediction mode candidate list, the motion vector candidate list or the merge candidate list is not reached and H2, H1 or H0 is sequentially added to each candidate list, redundancy check with the candidates in the candidate list may not be performed.

In addition, in adding of at least one candidate in the candidate list to the intra prediction mode candidate list, the motion vector candidate list or the merge candidate list as the candidate by the above-described method, redundancy check with N neighboring blocks used to construct the intra prediction mode candidate list, the motion vector candidate list or the merge candidate list may be performed only with respect to M candidate in the candidate list. Here, M may be a positive integer including "0" and N may be a positive integer greater than "0".

For example, as shown in FIG. 26, if the candidate H4 lastly included in the candidate list is first added to the intra prediction mode candidate list, the motion vector candidate list or the merge candidate list, redundancy check with the neighboring blocks used to construct the intra prediction mode candidate list, the motion vector candidate list or the merge candidate list may be performed only the candidates H4 and H3. For example, if the neighboring block is used to construct the intra prediction mode candidate list, the motion vector candidate list or the merge candidate list as shown in FIG. 25, redundancy check with the neighboring blocks A1 and B1 is first performed with respect to the candidate H4 and the same candidate is present, the candidate H4 may not be added to the intra prediction mode candidate list, the motion vector candidate list or the merge candidate list. If redundancy check with the neighboring blocks A1 and B1 is performed with respect to the next candidate H3 and the same candidate is not present, the next candidate may be added to the intra prediction mode candidate list, the motion vector candidate list or the merge candidate list as the candidate.

At this time, if the maximum number of candidates in the intra prediction mode candidate list, the motion vector candidate list or the merge candidate list is not reached and H2, H1 or H0 is sequentially added to each candidate list, redundancy check with the neighboring blocks may not be performed.

In addition, as shown in FIG. 26, if the candidate H4 lastly included in the candidate list is first added to the intra prediction mode candidate list, the motion vector candidate list or the merge candidate list as the candidate, redundancy check with the neighboring blocks used to construct the intra prediction mode candidate list, the motion vector candidate list or the merge candidate list may be performed only with respect to the candidates H1 and H0. For example, if the neighboring blocks are used to construct the intra prediction mode candidate list, the motion vector candidate list or the merge candidate list as shown in FIG. 25 and the number of candidates in the intra prediction mode candidate list, the motion vector candidate list or the merge candidate list does not satisfy the maximum number of candidates, candidate H1 or H0 is added and, if redundancy check with the neighboring blocks A1 and B1 is sequentially performed with respect to the candidate H1 and the same candidate is present, the candidate H1 may not be added to the intra prediction mode candidate list, the motion vector candidate list or the merge candidate list. If redundancy check with the neighboring blocks A1 and B1 is performed with respect to the next candidate H0 and the same candidate is not present, the candidate H0 may be added to the intra prediction mode candidate list, the motion vector candidate list or the merge candidate list as the candidate.

At this time, in adding of the candidates H4, H3 and H2 to the intra prediction mode candidate list, the motion vector candidate list or the merge candidate list, redundancy check with the neighboring blocks may not be performed.

In addition, in adding of at least one candidate in the candidate list to the intra prediction mode candidate list, the motion vector candidate list or the merge candidate list by the above-described method, redundancy check may not be performed with respect to the candidate in the candidate list and, when the number of candidates in the intra prediction mode candidate list, the motion vector candidate list or the merge candidate list does not satisfy the maximum number of candidates, the candidate in the candidate list may be included until the maximum number of candidates is satisfied.

In addition, in adding of at least one candidate in the candidate list to the intra prediction mode candidate list, the motion vector candidate list or the merge candidate list by the above-described method, redundancy check may not be performed with respect to the candidate in the candidate list and, when the number of candidates in the intra prediction mode candidate list, the motion vector candidate list or the merge candidate list does not satisfy the maximum number of candidates, the candidate in the candidate list may be included until(the maximum number of candidates–N) is satisfied. Here, N may be a positive integer greater than 0.

When at least one of the intra prediction mode candidate list, the motion vector candidate list or the merge candidate list is constructed using the candidate list, a maximum of N candidates in the candidate list may be used as the candidates of the intra prediction mode candidate list, the motion vector candidate list or the merge candidate list. Here, N may be a positive integer including 0.

For example, even if the number of candidates in the candidate list is equal to the maximum number M of candidates in the candidate list, if the maximum number of candidates in the candidate list defined in the encoder/decoder which may be used in the motion vector candidate list is (M−1), only (M−1) candidates in the candidate list may be used to construct the motion vector candidate list. Here, M may be a positive integer greater than 0. In addition, the above example is equally applicable to the intra prediction mode candidate list or the merge candidate list.

In addition, when the candidate list is used to construct at least one of the intra prediction mode candidate list, the motion vector candidate list or the merge candidate list of the current encoding/decoding target block, all available candidates in the candidate list which may be referenced by the current encoding/decoding target block may be used to construct the intra prediction mode candidate list, the motion vector candidate list or the merge candidate list.

At this time, if the current target block shares at least one of the intra prediction mode candidate list, the motion vector candidate list or the merge candidate list of the upper block, the candidate list which may be referenced by the current encoding/decoding target block may mean the candidate list of the upper block.

In addition, the candidate list may mean at least one of the intra prediction mode candidate list, the motion vector candidate list or the merge candidate list. That is, at least one of the intra prediction mode candidate list, the motion vector candidate list or the merge candidate list of the candidate list may be the same.

In addition, the candidate list may mean a candidate list other than at least one of the intra prediction mode candidate list, the motion vector candidate list or the merge candidate list. That is, the candidate list may be different from at least one of the intra prediction mode candidate list, the motion vector candidate list or the merge candidate list.

Figure 27:
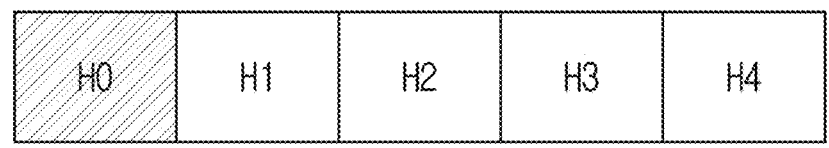
FIG. 27 is a view illustrating a process of adding candidates in a history-based candidate list as candidates of an IBC block vector prediction candidate list or an IBC merge candidate list, according to an embodiment of the present invention.

FIG. 27 is a view illustrating a process of adding candidates in a history-based candidate list as candidates of an IBC block vector prediction candidate list or an IBC merge candidate list, according to an embodiment of the present invention.

The IBC block vector prediction candidate list and/or the IBC merge candidate list may have the same meaning as the IBC block vector candidate list.

A history-based candidate list for an intra block copy (IBC) mode for copying a reference block in a current image region coded/decoded before encoding/decoding of a encoding/decoding target block may be separately constructed using at least one of the above methods. At this time, the history-based candidate list may have the same meaning as the candidate list. In addition, the history-based candidate list may have the same meaning as the IBC candidate list.

In addition, in this specification, a candidate included in the IBC block vector prediction candidate list or the IBC merge candidate list may be referred to as an IBC block vector candidate.

When at least one candidate in the history-based candidate list is used to construct at least one of the IBC block vector prediction candidate list or the IBC merge candidate list, at least one of the method of constructing the motion vector candidate list or the merge candidate list may be used.

If at least one candidate in the history-based candidate list is used to construct at least one of the IBC block vector prediction candidate list or the IBC merge candidate list, a candidate firstly added to the history-based candidate list may be firstly included in the IBC block vector prediction candidate list or the IBC the merge candidate list. If the maximum number of candidates in the IBC block vector prediction candidate list or the IBC merge candidate list is not reached, the next candidate in the history-based candidate list may be included in the IBC block vector prediction candidate list or the IBC merge candidate list.

For example, the history-based candidate list may include block vector information of the block coded/decoded before encoding/decoding of the current block as a candidate. At this time, the block vector information may be used for IBC prediction of the current block.

That is, at least one piece of block vector information in the history-based candidate list may be used to construct the IBC block vector candidate list.

In addition, the block vector information of the history-based candidate list may be added to the IBC block vector candidate list until the number of IBC block vector candidates included in the IBC block vector candidate list reaches a maximum number of merge candidates.

At this time, the maximum number of merge candidates which may be included in the IBC block vector candidate list may be determined based on a coding parameter. The coding parameter may be determined at a sequence parameter level.

For example, as shown in FIG. 27, when candidates in the history-based candidate list are included in order of H0, H1, H2, H3, H4, the candidate H0 firstly included in the history-based candidate list may be first used as the candidate of the IBC block vector prediction candidate list or the IBC merge candidate list. If the maximum number of candidates in the IBC block vector prediction candidate list or the IBC merge candidate list is not reached, the next candidate H1 may be used as the candidate of the IBC block vector prediction candidate list or the IBC merge candidate list.

In adding of at least one candidate in the history-based candidate list to the IBC block vector prediction candidate list or the IBC merge candidate list as the candidate by the above-described method, redundancy check with the candidates in the IBC block vector prediction candidate list or the IBC merge candidate list may be performed only with respect to M candidates in the history-based candidate list. Here, M may be a positive integer including 0.

For example, M may be 1. That is, in adding of at least one of block vector information in the history-based candidate list to the IBC block vector candidate list, redundancy check with the candidates in the IBC block vector candidate list may be performed only with respect to one candidate in the history-based candidate list. For example, redundancy check with the IBC block vector candidates in the IBC block vector candidate list may be performed only with respect to the last candidate in the history-based candidate list.

As another example, redundancy check with the neighboring block used as the IBC block vector candidate may be performed with respect to the last candidate in the history-based candidate list. That is, redundancy check with the neighboring block available as the IBC block vector candidate may be performed with respect to the block vector information lastly included in the history-based candidate list.

At this time, the candidates in the history-based candidate list which are not subjected to redundancy check are set not to be equal to the IBC block vector candidates in the IBC block vector candidate list, the block vector information of the history-based candidate list may be added to the IBC block vector candidate list until the number of IBC block vector candidates included in the IBC block vector candidate list reaches the maximum number of merge candidates.

At this time, the redundancy check may be performed only when a specific condition is satisfied. For example, the redundancy check may be performed only when the area (=width×height) of the current block exceeds K. For example, K may be 16. That is, the redundancy check may be performed only when the area of the current block exceeds 16.

In addition, the redundancy check may be performed only when the number of MC block vector candidates included in the IBC block vector candidate list is less than the maximum number of merge candidates which may be included in the IBC block vector candidate list. At this time, the block vector information of the history-based candidate list may be added to the IBC block vector candidate list until the number of IBC block vector candidates included in the IBC block vector candidate list reaches the maximum number of merge candidates based on the result of redundancy check.

For example, as shown in FIG. 27, if the candidate H0 firstly included in the history-based candidate list is first added to the IBC block vector prediction candidate list or the IBC merge candidate list as the candidate, redundancy check between the candidates in the IBC block vector prediction candidate list or the IBC merge candidate list may be performed only with respect to the candidates H0 and H1. At this time, if redundancy check is first performed with respect to the candidate H0 and the same candidate is present, the candidate H0 may not be added. If redundancy check is performed with respect to the next candidate H1 and the same candidate is not present, the candidate H1 may be added to the IBC block vector prediction candidate list or the IBC merge candidate list as the candidate. At this time, if the maximum number of candidates in the IBC block vector prediction candidate list or the IBC merge candidate list is not reached and H2, H3 or H4 is sequentially added to each candidate list, redundancy check with the candidates of each candidate list may not be performed.

In addition, in adding of at least one candidate in the history-based candidate list to the IBC block vector prediction candidate list or the BC merge candidate list as the candidate by the above-described method, redundancy check between the candidates in the IBC block vector prediction candidate list or the IBC merge candidate list may be performed only with respect to M candidates in the history-based candidate list. Here, M may be a positive integer including 0.

For example, as shown in FIG. 27, if the candidate H0 firstly included in the history-based candidate list is first added to the IBC block vector prediction candidate list or the IBC merge candidate list as the candidate, redundancy check with the candidates in the MC block vector prediction candidate list or the MC merge candidate list may be performed only with respect to the candidates H3 and H4. At this time, if the number of candidates in the MC block vector prediction candidate list or the MC merge candidate list does not satisfy the maximum number of candidates, the candidate H3 or H4 is added and, if redundancy check is first performed with respect to the candidate H3 and the same candidate is present, the candidate H3 may not be added. If redundancy check is performed with respect to the next candidate H4 and the same candidate is not present, the candidate H4 may be added to the IBC block vector prediction candidate list or the MC merge candidate list as the candidate. At this time, in adding of the candidates H0, H1 and H2 to the MC block vector prediction candidate list or the MC merge candidate list, redundancy check with the candidates in the candidate list may not be performed.

Figure 28:
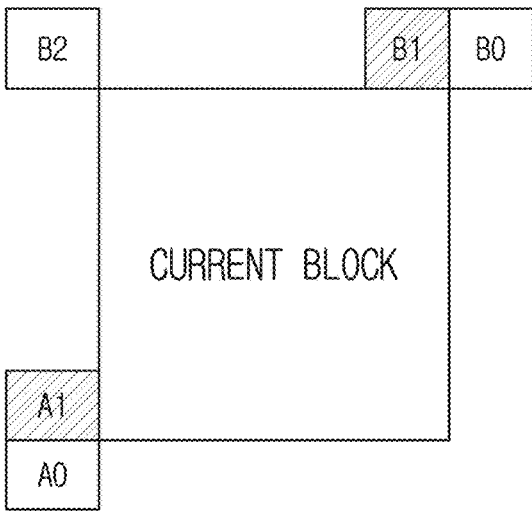
FIG. 28 is a view illustrating an embodiment of neighboring blocks used when an IBC block vector prediction candidate list or an IBC merge candidate list is constructed.

FIG. 28 is a view illustrating an embodiment of neighboring blocks used when an MC block vector prediction candidate list or an MC merge candidate list is constructed.

In adding of at least one candidate in the history-based candidate list to the MC block vector prediction candidate list or the IBC merge candidate list as the candidate by the same method as the above-described methods, redundancy check with N neighboring blocks used when the IBC block vector prediction candidate list or the IBC merge candidate list is constructed may be performed only with respect to M candidates in the history-based candidate list. Here, M may be a positive integer including 0, and N may be a positive integer greater than 0. For example, M may be 1.

For example, as shown in FIG. 27, if the candidate H0 firstly included in the history-based candidate list is first added to the IBC block vector prediction candidate list or the IBC merge candidate list as the candidate, redundancy check with the neighboring blocks used when the IBC block vector prediction candidate list or the IBC merge candidate list is constructed may be performed only with respect to the candidates H0 and H1. For example, if the neighboring blocks are used to construct the IBC block vector prediction candidate list or the IBC merge candidate list as shown in FIG. 28, redundancy check with the neighboring blocks A1 and B1 may be first performed with respect to the candidate H0. As a result, if the same candidate is present, the candidate H0 may not be added to the IBC block vector prediction candidate list or the IBC merge candidate list. If redundancy check with the neighboring blocks A1 and B1 is performed with respect to the next candidate H1 and the same candidate is not present, the candidate H1 may be added to the IBC block vector prediction candidate list or the IBC merge candidate list as the candidate. At this time, if the maximum number of candidates in the IBC block vector prediction candidate list or the IBC merge candidate list is not reached and H2, H3 or H4 is added to each history-based candidate list, redundancy check with the neighboring blocks may not be performed.

In addition, as shown in FIG. 27, if the candidate H0 firstly included in the history-based candidate list is first added to the IBC block vector prediction candidate list or the IBC merge candidate list as the candidate, redundancy check with the neighboring blocks used when the IBC block vector prediction candidate list or the IBC merge candidate list is constructed may be performed only with respect to the candidates H3 and H4. For example, if the neighboring blocks are used to construct the IBC block vector prediction candidate list or the IBC merge candidate list as shown in FIG. 28, the number of candidates in the IBC block vector prediction candidate list or the IBC merge candidate list does not reach the maximum number of candidates and the candidates H3 and/or H4 are added, and redundancy check with the neighboring blocks A1 and B1 are first performed with the candidate H3 and the same candidate is present, the candidate H3 may not be added to the IBC block vector prediction candidate list or the IBC merge candidate list. If redundancy check with the neighboring blocks A1 and B1 is performed with respect to the next candidate H4 and the same candidate is not present, the candidate H4 may be added to the IBC block vector prediction candidate list or the IBC merge candidate list as the candidate. At this time, in adding the candidates H0, H1 and/or H2 to the IBC block vector prediction candidate list or the IBC merge candidate list, redundancy check with the neighboring block may not be performed.

Figure 29:
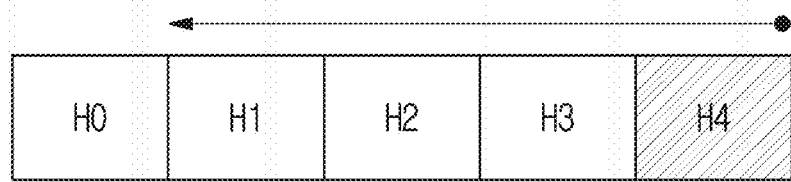
FIG. 29 is a view illustrating a process of adding candidates in a history-based candidate list as candidates of an IBC block vector prediction candidate list or an IBC merge candidate list, according to an embodiment of the present invention.

FIG. 29 is a view illustrating a process of adding candidates in a history-based candidate list as candidates of an IBC block vector prediction candidate list or an IBC merge candidate list, according to an embodiment of the present invention.

If at least one candidate in the history-based candidate list is used to construct at least one of the IBC block vector prediction candidate list or IBC merge candidate list, a candidate lastly included in the candidate list may be firstly included in the IBC block vector prediction candidate list or the IBC merge candidate list, as shown in FIG. 29. If the maximum number of candidates of the IBC block vector prediction candidate list or the IBC merge candidate list is not reached, the next candidate in the history-based candidate list may be included in the IBC block vector prediction candidate list or the IBC merge candidate list.

When the history-based candidate list is used to construct at least one of the IBC block vector prediction candidate list or the IBC merge candidate list of the current encoding/decoding target block, the IBC block vector prediction candidate list or the IBC merge candidate list may be constructed for all candidates available in the history-based candidate list which may be referenced by the current encoding/decoding target block.

In adding of at least one in the history-based candidate list as the IBC block vector candidate by the same method as the above-described embodiments, redundancy check with N neighboring blocks used as the IBC block vector candidate may be performed only with respect to M candidates in the history-based candidate list. Here, M may be a positive integer including 0 and N may be a positive integer greater than 0. For example, M may be 1. That is, in adding at least one candidate in the history-based candidate list to the IBC block vector candidate list as the candidate, redundancy check with the IBC block vector candidates may be performed only with respect to one candidate in the history-based candidate list.

For example, in adding of the block vector information included in the history-based candidate list to the IBC block vector candidate list as the candidate, redundancy check with the IBC block vector candidates may be performed only with respect to the last block vector information in the history-based candidate list. At this time, since the candidates in the history-based candidate list which are not subjected to redundancy check is set not to be equal to the block vectors of the neighboring blocks, the block vector information of the history-based candidate list may be added to the IBC block vector candidate list until the number of IBC block vector candidates included in the IBC block vector candidate list reaches the maximum number of merge candidates.

As a detailed example, as shown in FIG. 29, if the candidate H4 lastly included in the history-based candidate list is first added to the IBC block vector candidate list as the candidate, redundancy check with the neighboring blocks which may be used as the IBC block vector candidates may be performed only with respect to the candidate H4. For example, if the neighboring blocks are used to construct the IBC block vector candidates as shown in FIG. 28, redundancy check with the neighboring blocks A1 and B1 may be performed only with respect to the candidate H4, and H3, H2, H1 and H0 may be set not to have the same block vectors as the neighboring blocks.

At this time, the redundancy check may be performed only when a specific condition is satisfied. For example, the redundancy check may be performed only when the area (=width×height) of the current block exceeds K. For example, K may be 16. That is, the redundancy check may be performed only when the area of the current block exceeds 16.

If the current encoding/decoding target block shares at least one of the IBC block vector candidate list or the IBC merge candidate list of the upper block of the current target block, the history-based candidate list which may be referenced by the current encoding/decoding target block may mean the history-based candidate list of the upper block.

Figure 30:
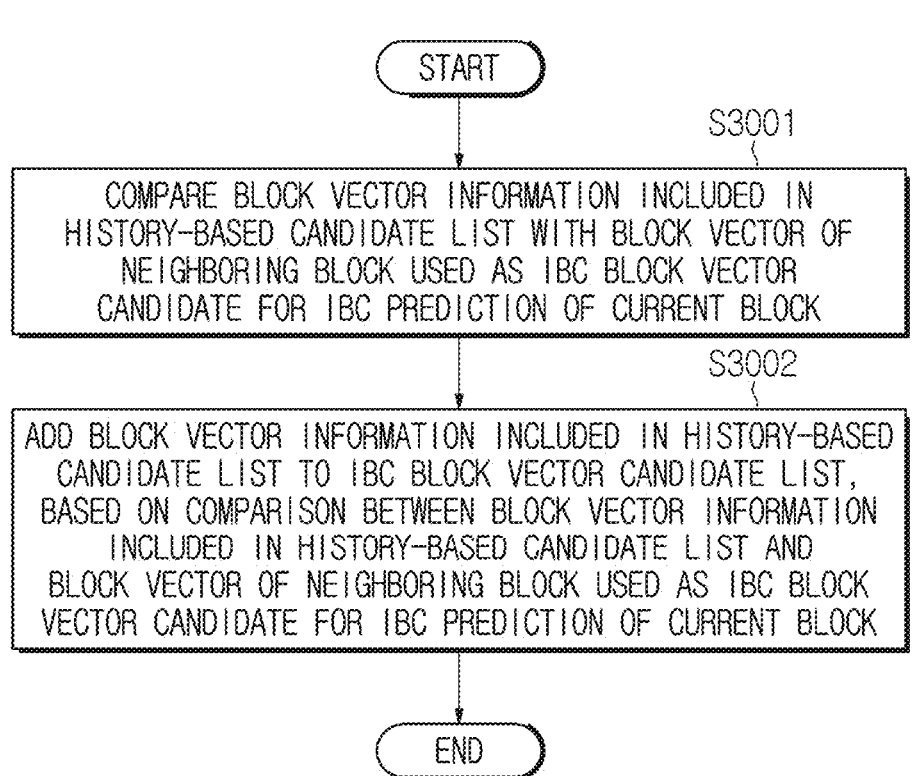
FIG. 30 is a view illustrating an image decoding method according to an embodiment of the present invention.

FIG. 30 is a view illustrating an image decoding method according to an embodiment of the present invention.

Referring to FIG. 30, an image decoding apparatus may compare block vector information included in a history-based candidate list with the block vector of a neighboring block used as an IBC block vector candidate for IBC prediction of a current block (S3001). Here, step S3001 may be performed only with respect to a candidate lastly included in the history-based candidate list.

In addition, step S3001 may be performed only when the area of the current block is greater than 16.

Meanwhile, step S3001 may be performed only when the number of IBC block vector candidates included in the IBC block vector candidate list is less than the maximum number of merge candidates which may be included in the IBC block vector candidate list.

In addition, the image decoding apparatus may add the block vector information included in the history-based candidate list to the IBC block vector candidate list based on the result of performing step S3001 (S3002).

Meanwhile, if the block vector information included in the history-based candidate list and the block vector of the neighboring block are different as the result of performing step S3001, the block vector information included in the history-based candidate list may be added to the IBC block vector candidate list.

Meanwhile, step S3002 may be performed until the number of IBC block vector candidates included in the IBC block vector candidate list reaches the maximum number of merge candidates which may be included in the IBC block vector candidate list.

Meanwhile, the maximum number of merge candidates which may be included in the IBC block vector candidate list may be determined based on a coding parameter.

Meanwhile, the neighboring block may include at least one of a block adjacent to the left side of the current block or a block adjacent to the upper side of the current block.

Meanwhile, the history-based candidate list may include the block vector information of the block decoded before decoding of the current block.

In addition, the image decoding apparatus may add the block vector information of the current block to the history-based candidate list.

At this time, if the block decoded before decoding of the current block and the current block belong to different CTU (Coding Tree Unit) rows, the block vector information of the current block may not be added to the history-based candidate list.

FIG. 31 is a view illustrating an image coding method according to an embodiment of the present invention.

Referring to FIG. 31, an image coding apparatus may compare block vector information included in a history-based candidate list with the block vector of a neighboring block used as an IBC block vector candidate for IBC prediction of the current block (S3101). Here, step S3101 may be performed only with respect to a candidate lastly included in the history-based candidate list.

In addition, step S3101 may be performed only when the area of the current block is greater than 16.

Meanwhile, step S3101 may be performed only when the number of IBC block vector candidates included in the IBC block vector candidate list is less than the maximum number of merge candidates which may be included in the IBC block vector candidate list.

In addition, the image coding apparatus may add the block vector information included in the history-based candidate list to the IBC block vector candidate list based on the result of performing step S3101 (S3102).

Meanwhile, if the block vector information included in the history-based candidate list and the block vector of the neighboring block are different as the result of performing step S3101, the block vector information included in the history-based candidate list may be added to the IBC block vector candidate list.

Meanwhile, step S3102 may be performed until the number of IBC block vector candidates included in the IBC block vector candidate list reaches the maximum number of merge candidates.

Meanwhile, the maximum number of merge candidates which may be included in the IBC block vector candidate list may be determined based on a coding parameter.

Meanwhile, the neighboring block may include at least one of a block adjacent to the left side of the current block or a block adjacent to the upper side of the current block.

Meanwhile, the history-based candidate list may include the block vector information of the block coded before coding of the current block.

In addition, the image decoding apparatus may add the block vector information of the current block to the history-based candidate list.

At this time, if the block coded before coding of the current block and the current block belong to different CTU (Coding Tree Unit) rows, the block vector information of the current block may not be added to the history-based candidate list.

The bitstream generated by the image coding method of the present invention may be temporarily stored in a non-transitory computer-readable recording medium and may be decoded by the above-described image decoding method.

Specifically, a non-transitory computer-readable recording medium for storing a bitstream generated by an image coding method includes comparing block vector information included in a history-based candidate list with a block vector of a neighboring block used as an intra block copy (IBC) block vector candidate for IBC prediction of a current block, and adding the block vector information included in the history-based candidate list to an IBC block vector candidate list based on the comparing. Comparing is performed only with respect to a candidate lastly included in the history-based candidate list.

FIG. 32 is a view illustrating an embodiment of constructing an IBC block vector candidate list using a history-based candidate list, according to an embodiment of the present invention.

Referring to FIG. 32, in adding of the block vector information of the history-based candidate list to the IBC block vector candidate list, an index indicating a candidate in a history-based candidate list may be used. At this time, the history-based candidate list used to construct the IBC block vector candidate list may be referred to as HmvpIbc-CandList. In addition, the IBC block vector candidate list may be referred to as bvCandList.

For example, the index (e.g., hMvpIdx) indicating the candidate in the history-based candidate list may have a value of 0 to (the maximum number of candidates in the history-based candidate list−1). At this time, the maximum number of candidates in the history-based candidate list may be referred to as NumHmvpIbcCand.

The candidate in the history-based candidate list may be selected by the index. For example, the candidate in the history-based candidate list may be selected by hMvpIdx in the form of HmvpIbcCandList[hMvpIdx].

FIG. 33 is a view illustrating an embodiment of a method of constructing an IBC block vector candidate list using a history-based candidate list, according to an embodiment of the present invention.

Referring to FIG. 33, in adding of the block vector information of the history-based candidate list to the IBC block vector candidate list, an index indicating a candidate in the history-based candidate list may be used. At this time, the history-based candidate list used to construct the IBC block vector candidate list may be referred to as HmvpIbc-CandList. In addition, the IBC block vector candidate list may be referred to as bvCandList.

For example, the index (e.g., hMvpIdx) indicating the candidate in the history-based candidate list may have a value of 1 to (the maximum number of candidates in the history-based candidate list). At this time, the maximum number of candidates in the history-based candidate list may be referred to as NumHmvpIbcCand.

The candidate in the history-based candidate list may be selected by the index. For example, the candidate in the history-based candidate list may be selected by hMvpIdx in the form of HmvpIbcCandList[hMvpIdx−1].

FIG. 34 is a view illustrating an embodiment of a method of constructing a merge candidate list using a history-based candidate list, according to an embodiment of the present invention.

Referring to FIG. 34, in adding of the block vector information of the history-based candidate list to the merge candidate list, an index indicating the candidate in the history-based candidate list may be used. At this time, the history-based candidate list used to construct the merge candidate list may be referred to as HmvpCandList. In addition, the merge candidate list may be referred to as mergeCandList.

For example, the index (e.g., hMvpIdx) indicating the candidate in the history-based candidate list may have a value of 0 to (the maximum number of candidates in the history-based candidate list−1). At this time, the maximum number of candidates in the history-based candidate list may be referred to as NumHmvpCand.

The candidate in the history-based candidate list may be selected by the index. For example, the candidate in the history-based candidate list may be selected by hMvpIdx in the form of HmvpCandList[hMvpIdx].

FIG. 35 is a view illustrating an embodiment of a method of constructing a merge candidate list using a history-based candidate list, according to an embodiment of the present invention.

Referring to FIG. 35, in adding of the block vector information of the history-based candidate list to the merge candidate list, an index indicating a candidate in the history-based candidate list may be used. At this time, the history-based candidate list used to construct the merge candidate list may be referred to as HmvpCandList. In addition, the merge candidate list may be referred to as mergeCandList.

For example, the index (e.g., hMvpIdx) indicating the candidate in the history-based candidate list may have a value of 1 to (the maximum number of candidates in the history-based candidate list). At this time, the maximum number of candidates in the history-based candidate list may be referred to as NumHmvpCand.

The candidate in the history-based candidate list may be selected by the index. For example, the candidate in the history-based candidate list may be selected by hMvpIdx in the form of HmvpCandList[hMvpIdx−1].

The embodiments of the present invention is applicable only when the block size is in a certain range.

For example, the present invention is applicable only when the size of the current block is equal to or greater than 8×8. For example, the present invention is applicable only when the size of the current block is equal to or greater than 16×16. For example, the present invention is applicable only when the size of the current block is equal to or greater than 32×32. For example, the present invention is applicable only when the size of the current block is equal to or greater than 64×64. For example, the present invention is applicable only when the size of the current block is equal to or greater than 128×128. For example, the embodiments are applicable only when the size of the current block is equal to or less than 4×4. For example, the embodiments are applicable only when the size of the current block is equal to or less than 8×8. For example, the embodiments are applicable only when the size of the current block is equal to or less than 16×16. For example, the embodiments are applicable only when the size of the current block is equal to or less than 16×16. For example, the embodiments are applicable only when the size of the current block is equal to or greater than 16×16 and equal to or less than 64×64.

As in the above-described embodiments of the present invention, a reference picture set used in a reference picture list construction and reference picture list modification process may use a reference picture list of at least one of L0, L1, L2 or L3.

According to the above-described embodiments of the present invention, when a boundary strength is calculated in a deblocking filter, one to N motion vectors of the current block may be used. Here, N may indicate a positive integer of 1 or more and may be 2, 3, 4, etc.

Even when the motion vector has at least one of 16-pixel (16-pel) unit, 8-pixel (8-pel) unit, 4-pixel(4-pel)unit, integer-pixel(integer-pel)unit, ½-pixel(½-pel)unit, ¼-pixel(¼-pel)unit, ⅛-pixel (⅛-pel)unit, 1/16-pixel(1/16-pel)unit, 1/32-pixel(1/32-pel)unit or 1/64-pixel(1/64-pel)unit, the above-described embodiments of the present invention are applicable. In addition, the motion vector in the encoding/decoding process of the current block may be selectively used for each pixel unit.

At least one of flags, indices, etc. entropy-coded by the encoder and entropy-decoded by the decoder may use at least one of the following binarization methods.

Truncated Rice binarization method
K-th order Exp_Golomb binarization method
Restricted K-th order Exp_Golomb binarization method
Fixed-length binarization method
Unary binarization method
Truncated Unary binarization method The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and structured for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be constructed to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image, the method comprising:

determining a prediction mode of a current block; and adding, in response to the prediction mode of the current block being an intra block copy (IBC) mode, a first block vector candidate included in a history-based candidate list to an IBC block vector candidate list, wherein, in response to the first block vector candidate being a last block vector candidate added to the history-based candidate list in order among block vector candidates included in the history-based candidate list, adding the first block vector candidate comprises:

performing a redundancy check by comparing the last block vector candidate with a second block vector candidate included in the IBC block vector candidate list; and adding, in response to a result of the redundancy check indicating that the last block vector candidate is different from the second block vector candidate, the last block vector candidate to the IBC block vector candidate list, and

wherein, in response to the first block vector candidate not being the last block vector candidate, adding the first block vector candidate comprises:

adding the first block vector candidate included in the history-based candidate list to the IBC block vector candidate list without performing the redundancy check, wherein the current block is obtained by dividing a current picture based on a division method.

2. The method of claim 1, wherein the redundancy check is performed only when a size of the current block is greater than 16.

3. The method of claim 1, wherein the second block vector candidate included in the IBC block vector candidate list is a block vector of a neighboring block of the current block.

4. The method of claim 1, wherein adding the first block vector candidate is performed only when a number of IBC block vector candidates included in the IBC block vector candidate list added from the history-based candidate list is less than a maximum number of merge candidates which can be included in the IBC block vector candidate list.

5. The method of claim 4, wherein adding the first block vector candidate is performed until the number of the IBC block vector candidates reaches the maximum number of the merge candidates which can be included in the IBC block vector candidate list.

6. The method of claim 5, wherein the maximum number of the merge candidates which can be included in the IBC block vector candidate list is determined based on a coding parameter.

7. The method of claim 3, wherein the neighboring block includes at least one of a block adjacent to a left side of the current block or a block adjacent to an upper side of the current block.

8. The method of claim 1, wherein blocks indicated by the block vector candidates included in the history-based candidate list are decoded before decoding of the current block.

9. A method of encoding an image, the method comprising:

determining a prediction mode of a current block; and adding, in response to the prediction mode of the current block being an intra block copy (IBC) mode, a first block vector candidate included in a history-based candidate list to an IBC block vector candidate list, wherein, in response to the first block vector candidate being a last block vector candidate added to the history-based candidate list in order among block vector candidates included in the history-based candidate list, adding the first block vector candidate comprises:

performing a redundancy check by comparing the last block vector candidate with a second block vector candidate included in the IBC block vector candidate list; and adding, in response to a result of the redundancy check indicating that the last block vector candidate is different from the second block vector candidate, the last block vector candidate to the IBC block vector candidate list, and wherein, in response to the first block vector candidate not being the last block vector candidate, adding the first block vector candidate comprises:

adding the first block vector candidate included in the history-based candidate list to the IBC block vector candidate list without performing the redundancy check, wherein the current block is obtained by dividing a current picture based on a division method.

10. The method of claim 9, wherein the redundancy check is performed only when a size of the current block is greater than 16.

11. The method of claim 9, wherein the second block vector candidate included in the IBC block vector candidate list is a block vector of a neighboring block of the current block.

12. The method of claim 9, wherein adding the first block vector candidate is performed only when a number of IBC block vector candidates included in the IBC block vector candidate list added from the history-based candidate list is less than a maximum number of merge candidates which can be included in the IBC block vector candidate list.

13. The method of claim 12, wherein adding the first block vector candidate is performed until the number of the IBC block vector candidates reaches the maximum number of the merge candidates which can be included in the IBC block vector candidate list.

14. The method of claim 13, wherein the maximum number of the merge candidates which can be included in the IBC block vector candidate list is determined based on a coding parameter.

15. The method of claim 11, wherein the neighboring block includes at least one of a block adjacent to a left side of the current block or a block adjacent to an upper side of the current block.

16. The method of claim 9,
wherein blocks indicated by the block vector candidates included in the history-based candidate list are encoded before encoding of the current block.

17. A non-transitory computer-readable recording medium for storing a bitstream generated by an image encoding method, the image encoding method comprises:
determining a prediction mode of a current block; and
adding, in response to the prediction mode of the current block being an intra block copy (IBC) mode, a first block vector candidate included in a history-based candidate list to an IBC block vector candidate list,
wherein, in response to the first block vector candidate being a last block vector candidate added to the history-based candidate list in order among block vector candidates included in the history-based candidate list, adding the first block vector candidate comprises:
performing a redundancy check by comparing the last block vector candidate with a second block vector candidate included in the IBC block vector candidate list; and
adding, in response to a result of the redundancy check indicating that the last block vector candidate is different from the second block vector candidate, the last block vector candidate to the IBC block vector candidate list, and
wherein, in response to the first block vector candidate not being the last block vector candidate, adding the first block vector candidate comprises:
adding the first block vector candidate included in the history-based candidate list to the IBC block vector candidate list without performing the redundancy check,
wherein the current block is obtained by dividing a current picture based on a division method.

* * * * *